(12) United States Patent
Nakazato

(10) Patent No.: US 12,450,908 B2
(45) Date of Patent: Oct. 21, 2025

(54) NON-TRANSITORY COMPUTER-READABLE RECORDING MEDIUM, DISPLAY CONTROL METHOD, AND INFORMATION PROCESSING APPARATUS

(71) Applicant: Fujitsu Limited, Kawasaki (JP)

(72) Inventor: Katsuhisa Nakazato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 18/134,574

(22) Filed: Apr. 14, 2023

(65) Prior Publication Data

US 2024/0029439 A1 Jan. 25, 2024

(30) Foreign Application Priority Data

Jul. 19, 2022 (JP) .................................. 2022-115093

(51) Int. Cl.
*G06V 20/52* (2022.01)
*G06Q 30/0203* (2023.01)
(Continued)

(52) U.S. Cl.
CPC ......... *G06V 20/52* (2022.01); *G06Q 30/0203* (2013.01); *G06V 10/764* (2022.01); *G06V 20/41* (2022.01)

(58) Field of Classification Search
CPC ...... G06V 20/52; G06V 20/41; G06V 10/764; G06Q 30/0203; G06Q 30/0281; G06Q 30/0201
See application file for complete search history.

(56) References Cited

U.S. PATENT DOCUMENTS 11,024,043 B1 * 6/2021 Othman ................. G06V 10/82
2008/0004951 A1 * 1/2008 Huang ............... G06Q 30/0271
705/14.66
(Continued)

FOREIGN PATENT DOCUMENTS

JP 2022-081036 A 5/2022
WO 2007/057843 A1 5/2007
WO 2019/049216 A1 3/2019

OTHER PUBLICATIONS

Vogel D et al: "Interactive Public Ambient Displays: Transitioning from Implicit to Explicit, Public to Personal, Interaction with Multiple Users", Internet Citation, Oct. 1, 2004, XP002426261, Retrieved from the Internet: URL:http://www.dgp.toronto.edu/papers/dvogel_UIST2004.pdf, 10 PP.
(Continued)

*Primary Examiner* — John B Strege
(74) *Attorney, Agent, or Firm* — XSENSUS LLP

(57) ABSTRACT

An information processing apparatus identifies a state of a specific user with respect to an object among a plurality of persons included in video data by analyzing the video data obtained by capturing a first area including a person or the object, generates a questionnaire related to the person or the object, identifies positions and orientations of users among the plurality of persons with respect to a display device by analyzing video data obtained by capturing a second area including the display device, and displays the questionnaire related to the specific user on the display device when the specific user is in a state of being closest to the display device and facing the display device and another user is away from the specific user and from the display device and does not face the display device.

8 Claims, 26 Drawing Sheets

(51) Int. Cl.
　　　*G06V 10/764*　　　(2022.01)
　　　*G06V 20/40*　　　(2022.01)

(56) References Cited

U.S. PATENT DOCUMENTS

| | | |
|---|---|---|
| 2014/0289013 A1* | 9/2014 | Kim .................. G06Q 30/02 705/7.32 |
| 2017/0011260 A1 | 1/2017 | Mihara et al. |
| 2018/0232796 A1 | 8/2018 | Glaser et al. |
| 2020/0188736 A1 | 6/2020 | Naito et al. |
| 2021/0304421 A1 | 9/2021 | Othman et al. |

OTHER PUBLICATIONS

Extended European Search Report issued Oct. 27, 2023, in corresponding European Patent Application No. 23168427.5, 14 pages.

* cited by examiner

FIG.5

| CUSTOMER ID | NAME | AGE | GENDER | FAMILY COMPOSITION | NOTIFICATION DESTINATION | NUMBER OF VISITS | CARD INFORMATION | ... |
|---|---|---|---|---|---|---|---|---|
| U01 | PATENT HANAKO | THIRTIES | FEMALE | HUSBAND AND CHILD | MAIL ADDRESS 1 | 10 | XXXX | ... |

FIG.6

QUESTIONNAIRE

Q1: PLEASE, SELECT YOUR AGE AND GENDER.
-FEMALE -TWENTIES -FORTIES -SIXTIES
-MALE -THIRTIES -FIFTIES -SEVENTIES OR OVER

Q2: IS THIS YOUR FIRST VISIT?
-FIRST TIME
-SECOND OR MORE TIME

Q3: WHAT DID YOU BUY?
-FOOD
-DAILY NECESSITIES
-OTHERS

Q4: WERE YOU SATISFIED WITH PURCHASED PRODUCT?
-SATISFIED
-NOT BAD
-UNSATISFIED

Q5: WERE YOU SATISFIED WITH SERVICE?
-SATISFIED
-NOT BAD
-UNSATISFIED

Q6: PLEASE, SELECT ANY REASON FOR DISSATISFACTION WITH SERVICE.
-HIGH PRICE
-CLERK WAS INHOSPITABLE
-OTHERS

| ID | NAME | USER INFORMATION | PRODUCT | PURCHASE STATUS | QUESTIONNAIRE RESULT |
|---|---|---|---|---|---|
| 1 | PATENT HANAKO | THIRTIES, FEMALE... | COSMETICS, FOOD... | PURCHASED | UNSATISFIED WITH SERVICE (CLERK WAS INHOSPITABLE) |
| ⋮ | ⋮ | ⋮ | ⋮ | ⋮ | ⋮ |

NON-TRANSITORY COMPUTER-READABLE RECORDING MEDIUM, DISPLAY CONTROL METHOD, AND INFORMATION PROCESSING APPARATUS

CROSS-REFERENCE TO RELATED APPLICATION

This application is based upon and claims the benefit of priority of the prior Japanese Patent Application No. 2022-115093, filed on Jul. 19, 2022, the entire contents of which are incorporated herein by reference.

FIELD

The embodiments discussed herein are related to a display control program, a display control method, and an information processing apparatus.

BACKGROUND

Accumulation of action histories of a user including a purchase history of a product, a use history of a facility, an order history of a restaurant, and the like as a database to be used for future service has become widespread. For example, answer results of a questionnaire are stored in a database by preparing the questionnaire on a table or the like or sending the questionnaire to a user at a later date.

Patent Literature 1: International Publication Pamphlet No. WO 2019/049216

SUMMARY

According to an aspect of an embodiment, a non-transitory computer-readable recording medium stores therein a display control program that causes a computer to execute a process. The process includes identifying a state of a specific user with respect to an object among a plurality of persons included in video data by analyzing the video data obtained by capturing a first area including a person or the object, generating a questionnaire related to the person or the object based on the state of the specific user with respect to the object, identifying positions and orientations of users among the plurality of persons with respect to a display device by analyzing video data obtained by capturing a second area including the display device, and displaying the questionnaire related to the specific user on the display device when the specific user is in a state of being closest to the display device and facing the display device and another user is away from the specific user and from the display device and does not face the display device based on the identified positions and orientations.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a customer DB;

FIG. 6 is a diagram illustrating a questionnaire DB;

FIG. 7 is a diagram illustrating an analysis result DB;

DESCRIPTION OF EMBODIMENTS

However, a lot of processing such as collection, review, and input of questionnaire results occur, and a large amount of processing is requested to construct a database. Incidentally, the number of items in a questionnaire tends to increase because more useful information is desired to be stored in a database, the burden on a user increases, and there are many users who do not answer the questionnaire.

Preferred embodiments will be explained with reference to accompanying drawings. Incidentally, the invention is not limited to the embodiments. In addition, the respective embodiments can be appropriately combined within a range without contradiction.

(a) First Embodiment

Overall Configuration

Figure 1:
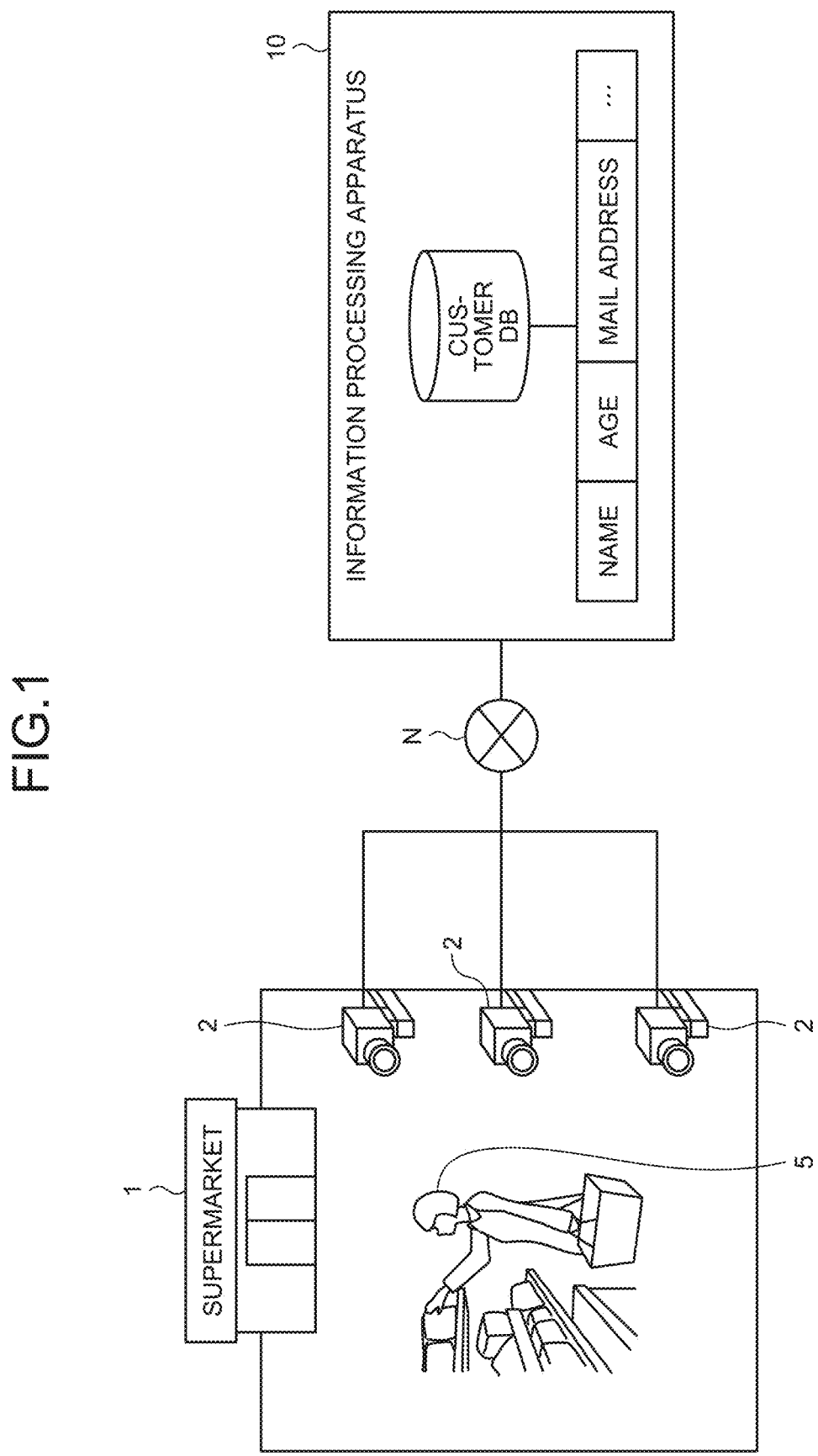
FIG. 1 is a diagram illustrating an overall configuration example of an information processing system according to a first embodiment.

FIG. 1 is a diagram illustrating an overall configuration example of an information processing system according to a first embodiment. As illustrated in FIG. 1, in the information processing system, a store 1, which is an example of a space having an area in which a product, which is an example of an object, is arranged, a plurality of cameras 2 installed at different locations in the store 1, and an information processing apparatus 10 that executes analysis of video data are connected via a network N. Incidentally, as the network N, various communication networks such as the Internet and a dedicated line can be adopted regardless of wired or wireless.

In the store 1, products to be purchased by customers 5 are displayed as in a supermarket or a convenience store, for example, and self-checkout using, for example, electronic payment or the like is used. Incidentally, an unattended. store that is used by only the registered customers 5 by registering the customers 5 in advance is assumed as an example of the store 1. For example, the customer 5 accesses a website or the like of a manager who manages the store 1, and registers a name, an age, a contact address (for example, an e-mail address or the like), and a settlement method (for example, a credit card number or the like). The customer 5 can use a user ID, a password, and a store entry card issued after the registration to enter the store 1 and make a payment by the registered settlement method to shop.

Each of the plurality of cameras 2 is an example of a monitoring camera that captures a predetermined region in the store 1, and transmits data of a captured video to the information processing apparatus 10. In the following description, the data of the video is sometimes referred to as "video data". In addition, the video data includes a plurality of frames in time series. The respective frames are assigned with frame numbers in chronologically ascending order. One frame is image data of a still image captured by the camera 2 at a certain timing.

Figure 2:
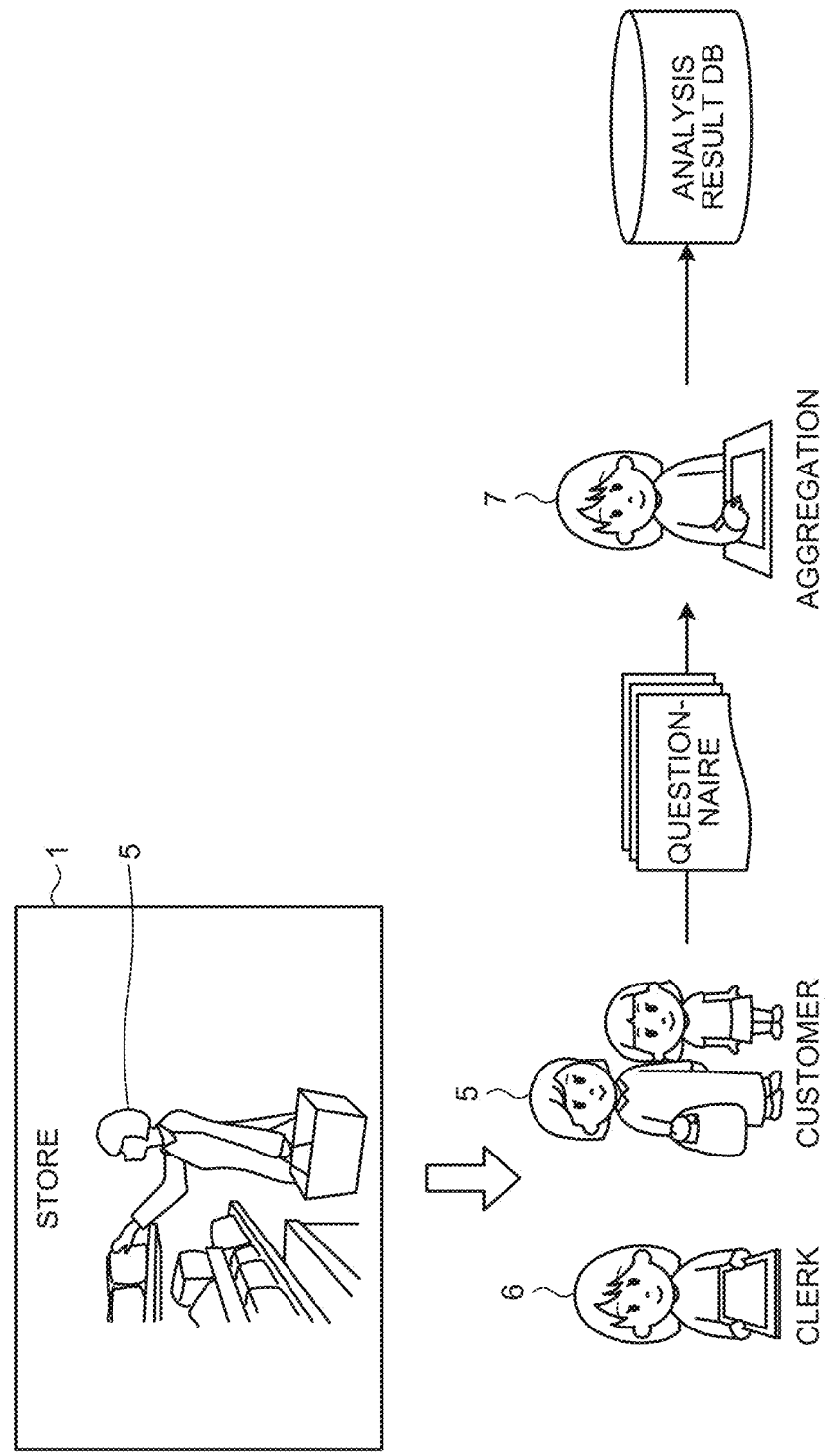
FIG. 2 as a diagram illustrating a reference technique.

The information processing apparatus 10 is an example of a computer device that includes a customer DB storing information regarding the customers 5 permitted to enter the store 1, receives video data from the plurality of cameras 2, and collects various types of data and the like in order to improve service for the customers 5. In the customer DB, a name, an age, a contact address (for example, an e-mail address or the Like), a settlement method (for example, a credit card number or the like), and the like are registered.
Description of Reference Technique As a measure for improving the service for the customers 5, a questionnaire for the customers 5 is used. FIG. 2 is a diagram illustrating a reference technique. As illustrated in FIG. 2, a clerk 6 hands a questionnaire sheet to the customer 5 who has purchased a product at the store 1 or the customer 5 who has entered the store 1 and did not purchase a product when the customer 5 leaves the store. The customer 5 fills in the received questionnaire sheet and sends the questionnaire sheet by mail or the like. Thereafter, the clerk 7 aggregates the questionnaire sheets sent from the respective customers 5 to create a database. In accordance with information stored in the database as described above, consideration is made on a timing for the clerk to start a conversation, an arrangement of products, expansion of products, and the like.

In this mariner, in the reference technique, a lot of processing such as collection, review, and input of questionnaire results occur, and a large amount of processing is required to construct the database. In addition, the number of items in the questionnaire tends to increase because more useful information is desired to be stored in the database, the burden on a user increases, and there are many users who do not answer the questionnaire.
Description of First Embodiment Therefore, the information processing apparatus 10 according to the first embodiment recognizes a relationship among humans, things, environment, and actions and attributes of humans from a video of the inside of the store 1, and digitizes a situation (context) of a shop to reduce processing of converting information that can be analyzed into the database. Specifically, the information processing apparatus 10 inputs video data, obtained by capturing an area in the store 1 where products are arranged, to a machine learning model, thereby identifying a relationship between a specific user (customer 5) and a product in an action of the customer 5 with respect to the product included in the video data. Subsequently, the information processing apparatus 10 acquires a psychological evaluation of the customer 5 with respect to the product for which the relationship has been identified. Thereafter, the information processing apparatus 10 registers a result related to the identified relationship and the psychological evaluation of the customer 5 in association with each other in a database indicating an analysis result of the product and stored in a storage unit.

Figure 3:
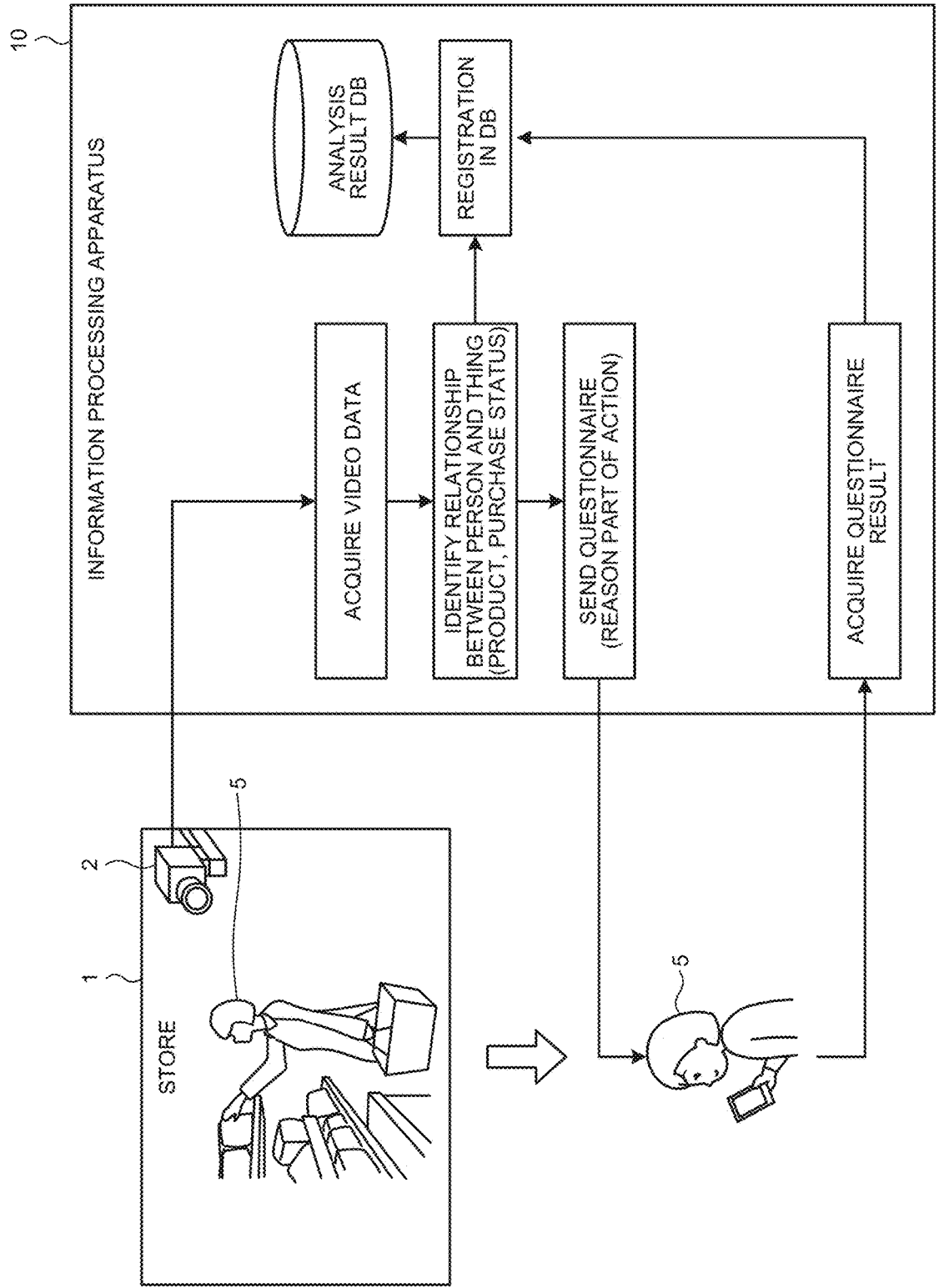
FIG. 3 is a diagram illustrating an information processing apparatus according to the first embodiment.

FIG. 3 is a diagram illustrating the information processing apparatus 10 according to the first embodiment. As illustrated in FIG. 3, the information processing apparatus 10 acquires the video data, or by capturing the inside of the store 1, inputs the respective frames in the video data to a trained machine learning model, and identifies the relationship between the customer 5 and the product. For example, the information processing apparatus 10 identifies a product purchase status, time, a location, an action (for example, gripping) with respect to the product, and the like.

Subsequently, the information processing apparatus 10 identifies an item that is not identifiable from the video based on the relationship between the customer 5 and the product as a psychological evaluation, generates a questionnaire regarding the psychological evaluation, and transmits the questionnaire to a terminal or the like of the customer 5. For example, the information processing apparatus 10 transmits the questionnaire asking the customer 5 who has not purchased any product a reason for "why didn't you purchase any product?".

Thereafter, when receiving an answer to the questionnaire, the information processing apparatus 10 associates an identification result identified from the video with the questionnaire result to create the database. For example, the information processing apparatus 10 stores "age, gender, and product purchase status" identified from the video and the questionnaire result of the "reason why a purchase of any product has not been made" in association with each other.

Figure 4:
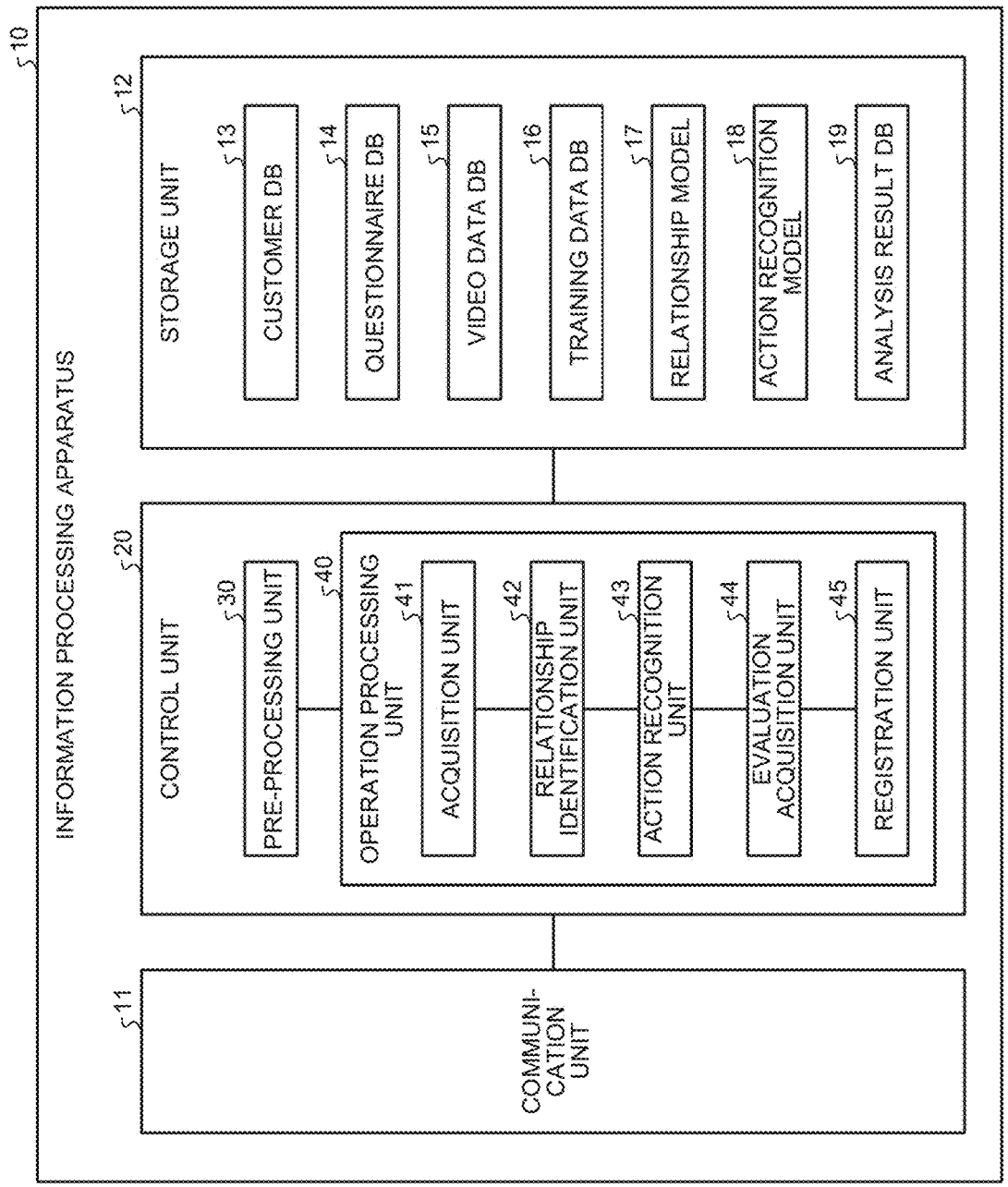
FIG. 4 is a functional block diagram illustrating a functional configuration of the information processing apparatus according to the first embodiment.

In this manner, the information processing apparatus 10 can recognize actions of visitors in real time from a storefront video or the like and narrow down a target visitor and a transmission timing to automatically transmit the questionnaire. Therefore, the information processing apparatus 10 can acquire only the effective questionnaire result, and thus, the amount of processing required to construct the database can be reduced.
Functional Configuration FIG. 4 is a functional block diagram illustrating a functional configuration of the information processing apparatus 10 according to the first embodiment. As illustrated in FIG. 4, the information processing apparatus 10 includes a communication unit 11, a storage unit 12, and a control unit 20.

The communication unit 11 is a processing unit that controls communication with other devices, and is, for example, a communication interface or the like. For example, the communication unit 11 receives video data or the like from each of the cameras 2, and outputs a processing result or the like of the information processing apparatus 10 to a device designated in advance or the like.

The storage unit 12 is a processing unit that stores various types of data, a program to be executed by the control unit 20, and the like, and is realized by, for example, a memory, a hard disk, or the like. The storage unit 12 stores a customer DB 13, a questionnaire DB 14, a video data DB 15, a training data DB 16, a relationship model 17, an action recognition model 18, and an analysis result DB 19.

The customer DB 13 is a database that stores information regarding the customer 5. The information stored here is information of the customer (user) 5 who visits the store 1 and wishes to purchase a product, and is collected and registered by performing user registration prior to a visit to the store.

FIG. 5 is a diagram illustrating the customer DB 13. As illustrated in FIG. 5, the customer DB 13 stores "customer ID, name, age, gender, family composition, notification destination, number of visits, card information" and the like. The "customer ID" is an identifier for identifying the customer 5. The "name, age, gender, family composition, and card information" are information input by the customer 5 at the time of user registration, and the "number of visits" is the number of visits counted at the time of entry.

The questionnaire GB 14 is a database that stores a questionnaire to be transmitted to the customer 5. FIG. 6 is a diagram illustrating the questionnaire DB 14. As illustrated in FIG. 6, the questionnaire to be transmitted can include a plurality of question items each of which is obtained by associating a question (Q) with choices.

In the example of FIG. 6, Question 1 (Q1) is a question item for inquiring about the age and gender of a customer, and "female/male and twenties/thirties/forties/fifties/sixties/seventies or over" are prepared as answer choices. In addition, Question 3 (Q3) is a question item for inquiring about a type of a purchased product, and "food/daily necessities/others" are prepared as answer choices.

Incidentally, each question can be associated with 5W1H ((when, where, who, what, why, and how) indicating the intention of the question. For example, "who" is associated with Q1 "Please, select your age and gender.", "why" is associated with Q6 "Please, select any reason for dissatisfaction with service", and the like.

The video data DB 15 is a database that stores video data captured by each of the plurality of cameras 2 installed in the store 1. For example, the video data DB 15 stores the video data for each of the cameras 2 or for each captured time zone.

The training data DB 16 is a database that stores various types of training data used for generation of various machine learning models, described in the embodiments, including the relationship model 17, the action recognition model 18, and the like. The training data stored here can include supervised training data to which correct answer information is added and unsupervised training data to which correct answer information is not added.

The relationship model 17 is an example of a machine learning model that identifies a relationship between a person and an object in an action of a specific user with respect to the object included in video data. Specifically, the relationship model 17 is a model for human object interaction detection (HOID) generated by machine learning for identifying a relationship between a person and a person or a relationship between a person and a thing (object).

For example, when the relationship between a person and a person is to be identified, a model for HOID that identifies and outputs a first class indicating a first person and first region information indicating a region where the first person appears, a second class indicating a second person and second region information indicating a region where the second person appears, and a relationship between the first class and the second class according to an input of a frame in video data is used as the relationship model 17.

In addition, when the relationship between a person and an object is to be identified, a model for HOID that identifies and outputs a first class indicating a person and first region information indicating a region where the person appears, a second class indicating an object and second region information indicating a region where the object appears, and a relationship between the first class and the second class is used as the relationship model 17.

Incidentally, the relationship described here is not limited to a simple relationship such as "hold", but includes complicated relationships such as "hold Product A. in a right hand", "return Product B to a shelf", and "put a product in a shopping basket". Incidentally, as the relationship model 17, the above-described two models for HOID may be separately used, or a model for HOID generated to identify both the relationship between a person and a person and the relationship between a person and an object may be used. In addition, the relationship model 17 is generated by the control unit 20 to be described later, but a model generated in advance may be used.

The action recognition model 18 is an example of a machine learning model that executes recognition of skeleton information and an action of a person from video data. Specifically, the action recognition model 18 outputs two-dimensional skeleton information and an action recognition result in response to an input of image data. For example, the action recognition model 18 is an example of a deep learning device that estimates two-dimensional joint positions (skeleton coordinates) of a head, wrists, a waist, ankles, and the like with respect to two-dimensional image data of a person, and recognizes a basic motion and a rule defined by a user.

When the action recognition model 18 is used, the basic motion of the person can be recognized, and the positions of the ankles, an orientation of a face, and an orientation of a body can be acquired. Examples of the basic motion include walking, running, stopping, and the like. The rule defined by the user is a transition of skeleton information corresponding to each action until a product is taken by the hand. Incidentally, the action recognition model 18 is generated by the control unit 20 to be described later, but data generated in advance may be used.

The analysis result DB 19 is a database that stores information regarding an analysis result collected by the information processing apparatus 10. FIG. 7 is a diagram illustrating the analysis result DB 19. As illustrated in FIG. 7, the analysis result DB 19 stores "ID, name, user information, product, purchase status, questionnaire result" and the like.

The "ID" is an identifier for identifying an analysis result. The "name" is a name of the customer 5, and is identified using the customer DB 13 at the time of entry or product purchase. The "user information" is age, gender, family composition, and the like of the customer 5, and is identified using the customer DB 13. The "product" is information on a product purchased by the customer 5, and is identified using the customer DB 13 when the product is purchased.

The "purchase status" is information indicating whether or not a product has been purchased in a visit, and is identified using the customer DB 13 at the time of product purchase. The "questionnaire result" is an answer to a questionnaire transmitted by the control unit 20 to be described later.

An example in FIG. 7 illustrates that "Patent Hanako" corresponds to "thirties and female", has purchased "cosmetics and food" and answered "unsatisfied with service (clerk was inhospitable)" in the questionnaire. The information stored here is used to detect a situation of a shop and determine a response policy. For example, if information such as "presence of visitor, with family, young male and female, and female taking initiative" is registered, the clerk is caused to recommend a product that is intended for families and is popular among females.

Returning to FIG. 4, the control unit 20 is a processing unit that manages the entire information processing apparatus 10, and is realized by, for example, a processor or the like. The control unit 20 includes a pre-processing unit 30 and an operation processing unit 40. Incidentally, the pre-processing unit 30 and the operation processing unit 40 are realized by electronic circuits included in the processor, processes executed by the processor, or the like.

Pre-Processing Unit 30

The pre-processing unit 30 is a processing unit that executes generation of the respective models, rules, and the like using training data stored in the storage unit 12 prior to the operation of action prediction and questionnaire aggregation performed by the operation processing unit 40.

Generation of Relationship Model

The pre-processing unit 30 is a processing unit that generates the relationship model 17 using the training data stored in the training data DB 16. Here, an example in which a model for HOID using a neural network or the like is generated as the relationship model 17 will be described as one example. Incidentally, generation of a model for HOID that identifies a relationship between a person and an object will be described as an example, but a model for HOID that identifies a relationship between a person and a person can be similarly generated.

Figure 8:
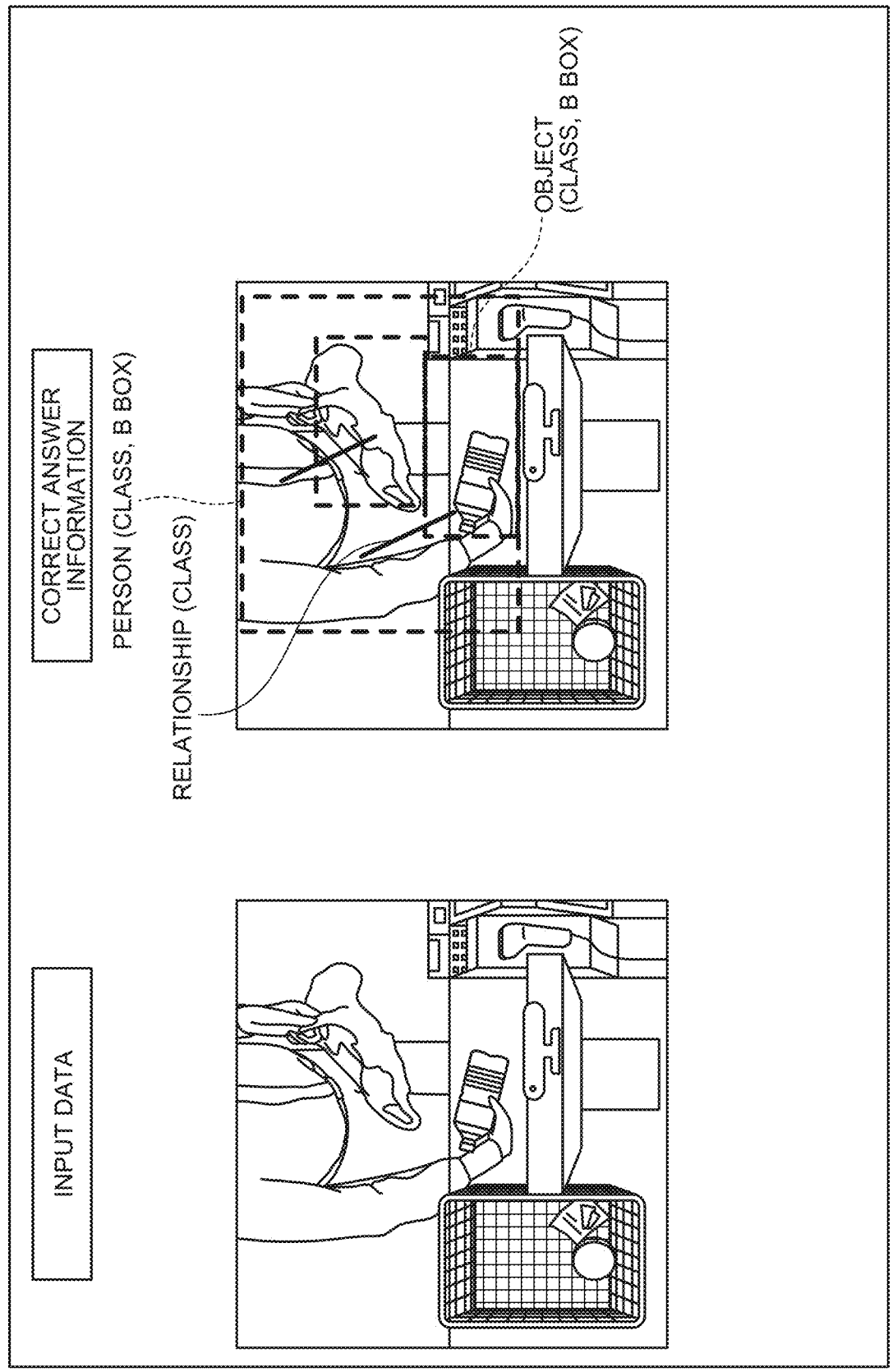
FIG. 8 is a diagram illustrating training data.

First, training data used for machine learning of the model for HOLD will be described. FIG. 8 is a diagram illustrating the training data. As illustrated in FIG. 8, each piece of the training data includes image data (explanatory variable) serving as input data and correct answer information (objective variable) set for the image data.

In the correct answer information, a class (first class) of a person to be detected, a class (second class) of an object to be purchased or operated by the person, a relationship class indicating interaction between the person and the object, and a B box (bounding box: region information of the object) indicating a region of each of the classes are set. That is, information regarding the object gripped by the person is set as the correct answer information. Incidental the interaction between the person and the object is an example of the relationship between the person and the object. In addition, in a case of being used to identify a relationship between a person and a person, a class indicating the other person is used as the second class, region information of the other person is used as the region information of the second class, and the relationship between the person and the person is used as the relationship class.

Figure 9:
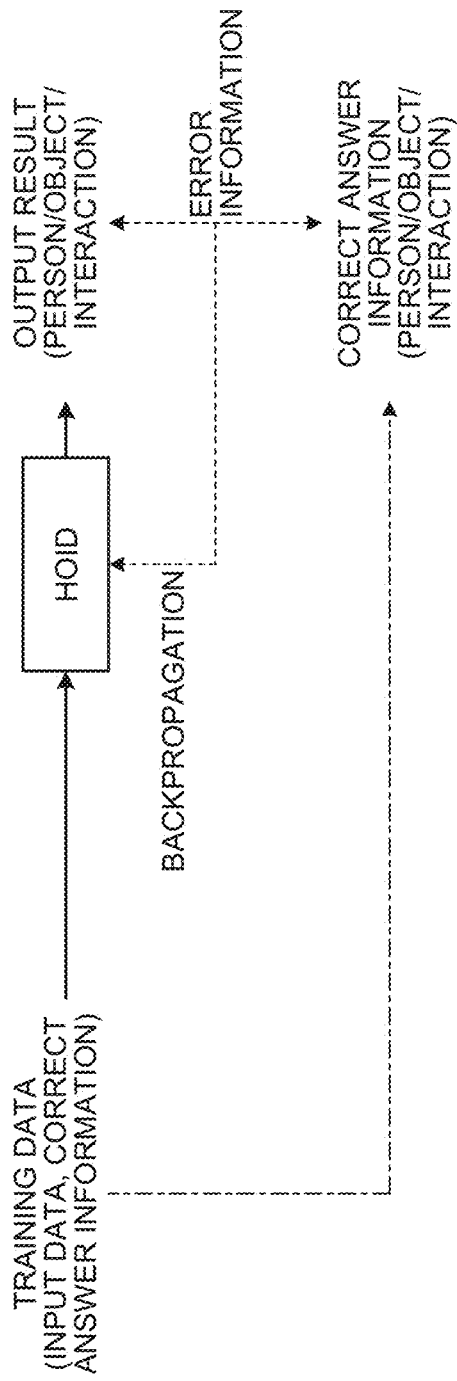
FIG. 9 is a diagram illustrating machine learning of a relationship model.

Next, machine learning of the model for HOID using the training data will be described. FIG. 9 is a diagram illustrating machine learning of the relationship model 17. As illustrated in FIG. 9, the pre-processing unit 30 inputs the training data into the model for HOID, and acquires an output result of the model for HOID. The output result includes the class of the person detected by the model for HOID, the class of the object, the relationship (interaction) between the person and the object, and the like. Then, the pre-processing unit 30 calculates error information between the correct answer information of the training data and the output result of the model for the HOID, and executes machine learning for updating parameters included in the model for the HOID by backpropagation so as to reduce an error.

Generation of Action Recognition Model 18

The pre-processing unit 30 is a processing unit that generates the action recognition model 18 using training data. Specifically, the pre-processing unit 30 generates the action recognition model 18 by supervised learning using training data with correct answer information (labels).

Figure 10:
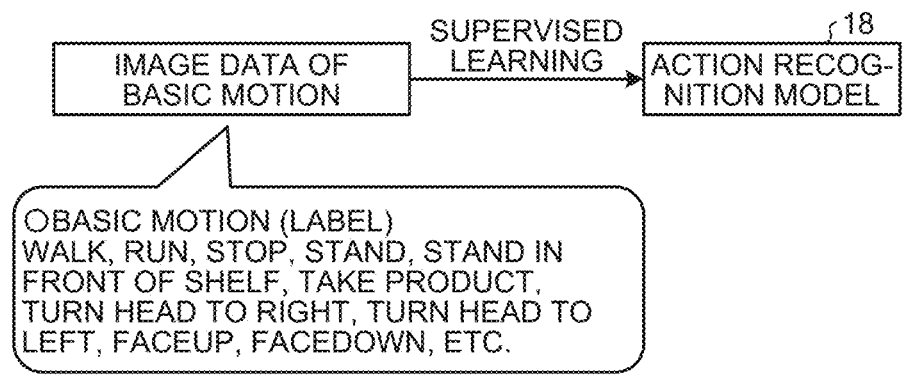
FIG. 10 is a diagram illustrating generation of an action recognition model.

FIG. 10 is a diagram illustrating the generation of the action recognition model 18. As illustrated in FIG. 10, the pre-processing unit 30 inputs image data of a basic motion added with a basic motion label to the action recognition model 18, and executes machine learning of the action recognition model 18 so as to reduce an error between an output result of the action recognition model 18 and the label. For example, the action recognition model 18 is a neural network. The pre-processing unit 30 changes parameters of the neural network by executing the machine learning of the action recognition model 18. The action recognition model 18 inputs an explanatory variable, which is image data (for example, image data of a person performing a basic motion), to the neural network. Then, the action recognition model 18 generates a machine learning model in which the parameters of the neural network have been changed so as to reduce an error between an output result output from the neural network and correct answer data (objective variable) which is a label of the basic motion.

Incidentally, as the training data, each piece of image data to which "walk", "ran", "stop", "stand", "stand in front of shelf", "take product", "turn head to right", "turn head to left", "faceup", "facedown", or the like is added as the "label" can be used. Incidentally, the generation of the action recognition model 18 is merely an example, and other methods can be used. In addition, as the action recognition model 18, action recognition disclosed in Japanese Laid-open Patent Publication No. 2020-71665 and Japanese Laid-open Patent Publication No. 2020-77343 can also be used.

Operation Processing Unit 40

Returning to FIG. 4, the operation processing unit 40 is a processing unit that includes an acquisition unit 41, a relationship identification unit 42, an action recognition unit 43, an evaluation acquisition unit 44, and a registration unit 45, and executes transmission of a questionnaire to a person appearing in video data using the respective models prepared in advance by the pre-processing unit 30.

The acquisition unit 41 is a processing unit that acquires video data from each of the cameras 2 and stores the video data in the video data DB 15. For example, the acquisition unit 41 may perform the acquisition from each of the cameras 2 as needed or periodically.

In addition, the acquisition unit 41 acquires customer information when the customer 5 enters the store, and outputs the customer information to each processing unit of the operation processing unit 40. For example, the acquisition unit 41 causes a user to authenticate a user card or a fingerprint or to input an ID and a password at the time of entry to acquire a "customer ID" that has entered the store.

Then, the acquisition unit 41 refers to the customer DB 13 and acquires a name, age, and the like associated with the "customer ID".

Identification of Relationship

The relationship identification unit 42 is a processing unit that executes a relationship identification process of identifying a relationship between a person and a person or a relationship between a person and an object appearing in video data using the relationship model 17. Specifically, for each of frames included in the video data, the relationship identification unit 42 inputs each of the frames to the relationship model 17 and identifies a relationship according to an output result of the relationship model 17. Then, the relationship identification unit 42 outputs the identified relationships to the evaluation acquisition unit 44, the registration unit 45, and the like.

Figure 11:
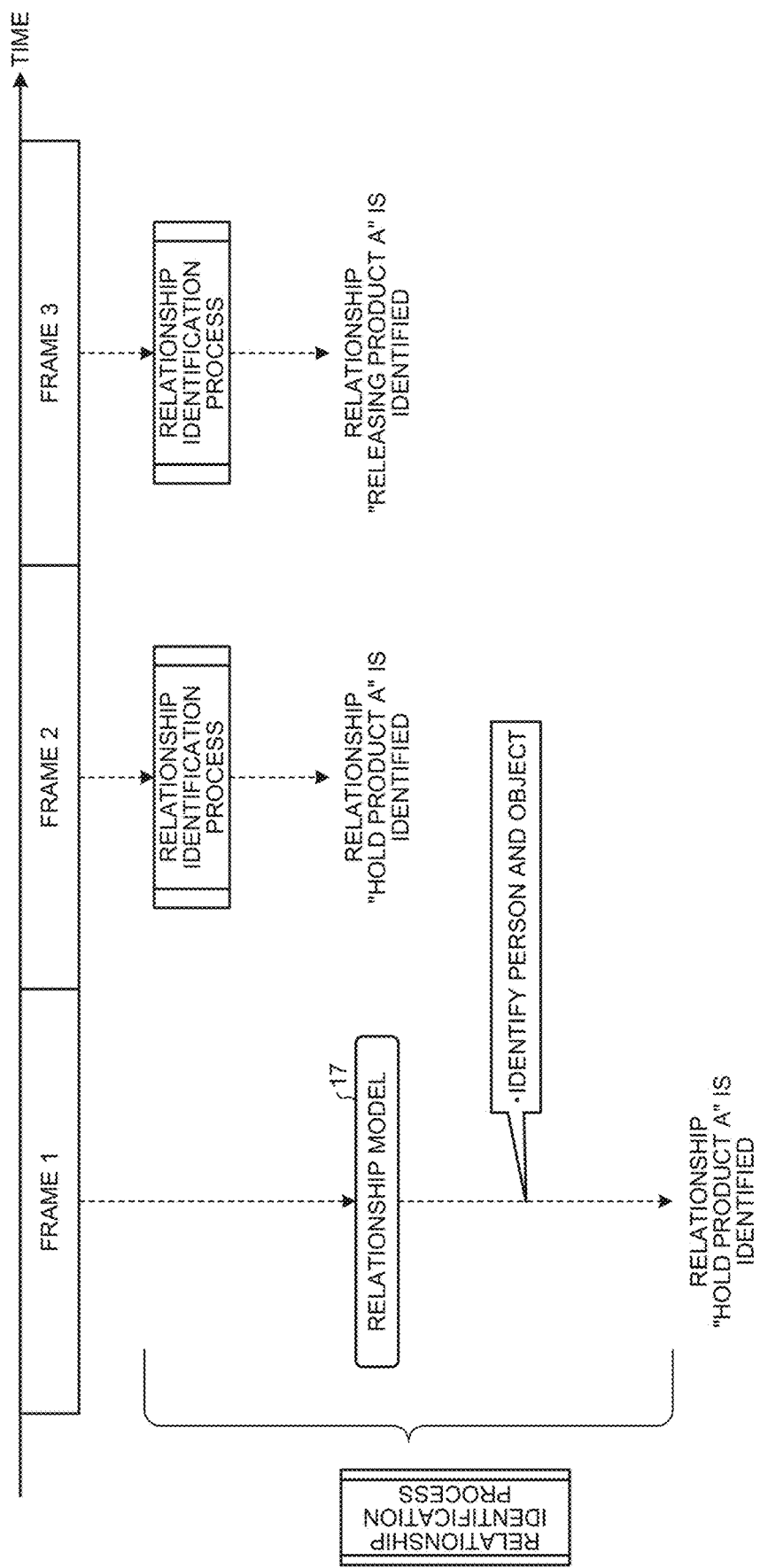
FIG. 11 is a diagram illustrating identification of a relationship.

FIG. 11 is a diagram illustrating identification of a relationship. As illustrated in FIG. 11, the relationship identification unit 42 inputs Frame 1 to the machine-learned relationship model 17, and identifies a class of a first person, a class of a second person, and a relationship between the persons. As another example, the relationship identification unit 42 inputs the frame to the machine-learned relationship model 17 to identify a class of a person, a class of an object, and a relationship between the person and the object. In this manner, the relationship identification unit 42 identifies the relationship between persons or the relationship between a person and an object for each of the frames using the relationship model 17.

Figure 12:
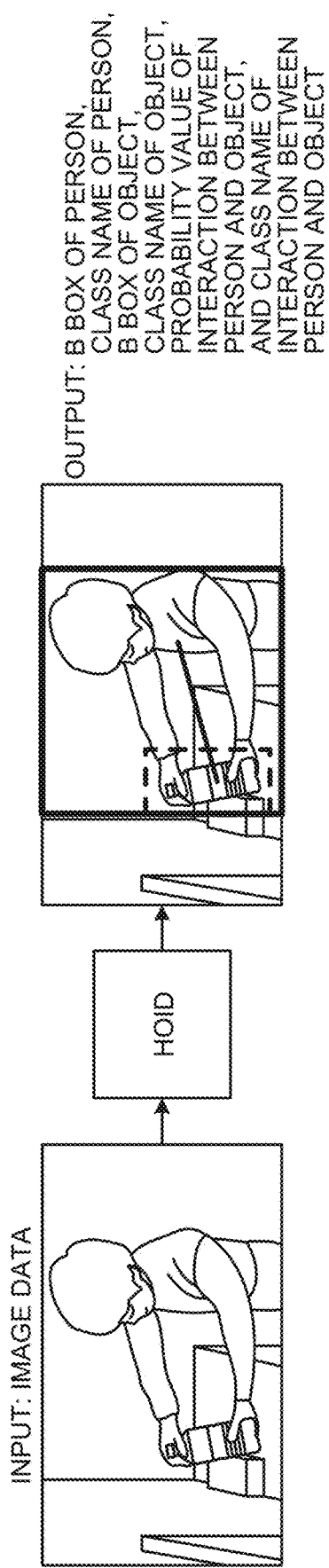
FIG. 12 is a diagram illustrating identification of a relationship by HOID.

FIG. 12 is a diagram illustrating identification of a relationship by HOID. As illustrated in FIG. 12, the relationship identification unit 42 inputs each of the frames (image data) included in the video data to the HOID (relationship model 1) and acquires an output result of the HOID. Specifically, the relationship identification unit 42 acquires a B box of a person, a class name or a person, a B box of an object, a class name of an object, a probability value of interaction between the person and the object, and a class name of the interaction between the person and the object.

As a result, for example, the relationship identification unit 42 identifies a "human (customer)", a "product (thing)", or the like as the class of the person, and identifies a relationship that the "customer holds the product" between the "human (customer)" and the "product (thing)". The relationship identification unit 42 executes the above-described relationship identification process for each subsequent frame, such as Frame 2 and Frame 3, to identify a relationship "hold Product A" and a relationship "releasing Product A" for the respective frames. Incidentally, the relationship identification unit 42 can also acquire a product purchase status by self-checkout or information at the time of exit.

In addition, the relationship identification unit 42 can also identify time and a location at which an action has been performed and information related to a relationship from the action of a customer included in the video data with respect to an object. For example, the relationship identification unit 42 identifies time of a frame in video data for which the relationship has been identified, a location of the camera 2 that has captured the video data, and the like.

Action Recognition

The action recognition unit 43 is a processing unit that recognizes an action and a gesture of a person from video data using the action recognition model 18. Specifically, the action recognition unit 43 inputs each frame in the video data to the action recognition model 18, identifies the action and gesture of the person using skeleton information and a basic motion of each part of the person obtained from the action recognition model 18, and outputs the identified action and gesture to the evaluation acquisition unit 44, the registration unit 45, and the like.

Figure 13:
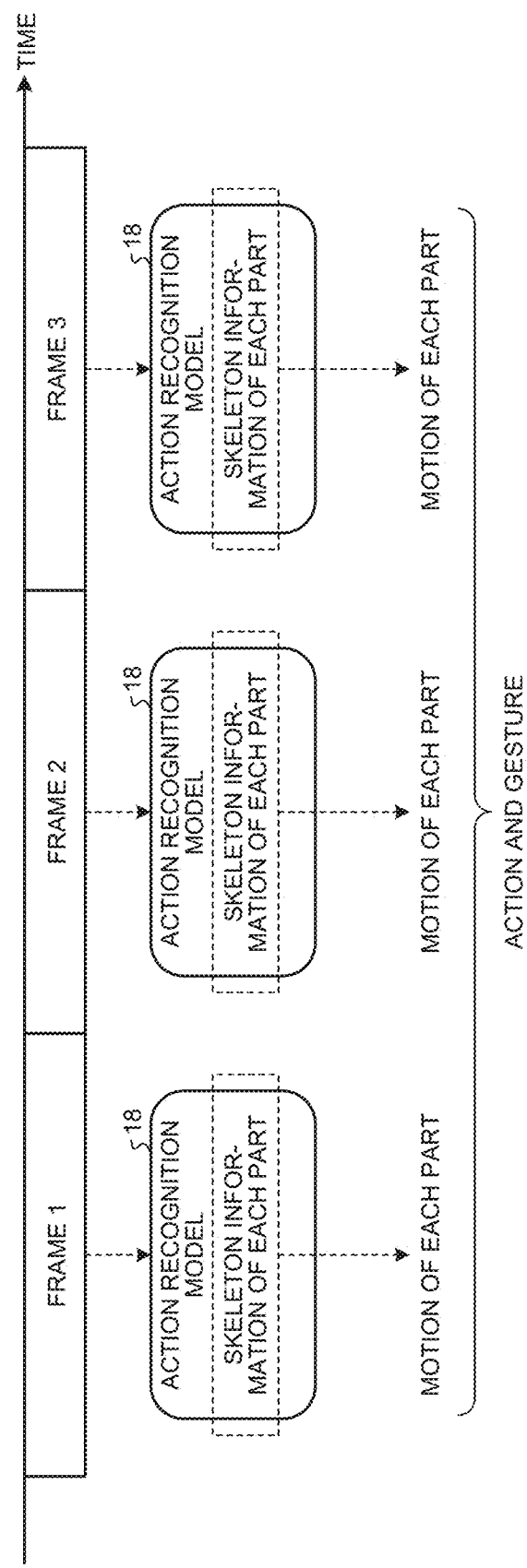
FIG. 13 is a diagram illustrating action recognition.

FIG. 13 is a diagram illustrating action recognition. As illustrated in FIG. 13, the action recognition unit 43 inputs Frame 1, which is image data, to the action recognition model 18. The action recognition model 18 generates skeleton information of each part according to the input of Frame 1, and outputs a motion of each part according to the skeleton information of each part. For example, the action recognition unit 43 can acquire motion information of each part such as "face: facing front, arms: being raised, legs: walking, and so on" by using the action recognition model 18.

In addition, the action recognition unit 43 also executes recognition processing using the action recognition model 18 for the respective subsequent frames of Frame 2 and Frame 3, and identifies motion information of each part of a person appearing in the frame for each of the frames. Then, the action recognition unit 43 can also refer to the association between a representative gesture and a change in an action held in advance in association, and identify a more specific action, gesture, and the like using a change in an action recognition result (that is the motion information of each part).

For example, the action recognition unit 43 can recognize a "dissatisfied" gesture in a case where a "dissatisfied motion" designated in advance is detected, such as a case where an orientation of a face moves left and right within five frames or a case where a product is returned to an original state after fifteen or more frames have passed since holding of the product. In addition, the action recognition unit 43 can recognize a "satisfied" gesture in a case where a "satisfied motion" designated in advance is detected, such as a case where a product is put in a basket within less than three frames after holding of the product.

The evaluation acquisition unit 44 is a processing unit that acquires a psychological evaluation of the customer 5 for a product for which a relationship has been identified by the relationship identification unit 42. Specifically, the evaluation acquisition unit 44 can also adopt a "gesture" recognized by the action recognition unit 43 as the psychological evaluation.

In addition, the evaluation acquisition unit 44 can transmit a questionnaire regarding a psychological index related to a product of the customer 5 to a terminal associated with the customer 5, and acquire an answer result or the questionnaire received from the terminal as the psychological evaluation of the customer.

As a specific example, the evaluation acquisition unit 44 generates a partial questionnaire for inquiring of items that have not been identified from an action of the customer 5 with respect to a product among the plurality of items included in the questionnaire stored in the questionnaire DB 14. Then, the evaluation acquisition unit 44 can transmit the partial questionnaire to a terminal of the customer and acquire art answer result of the questionnaire received from the terminal as the psychological evaluation of the customer.

Figure 14:
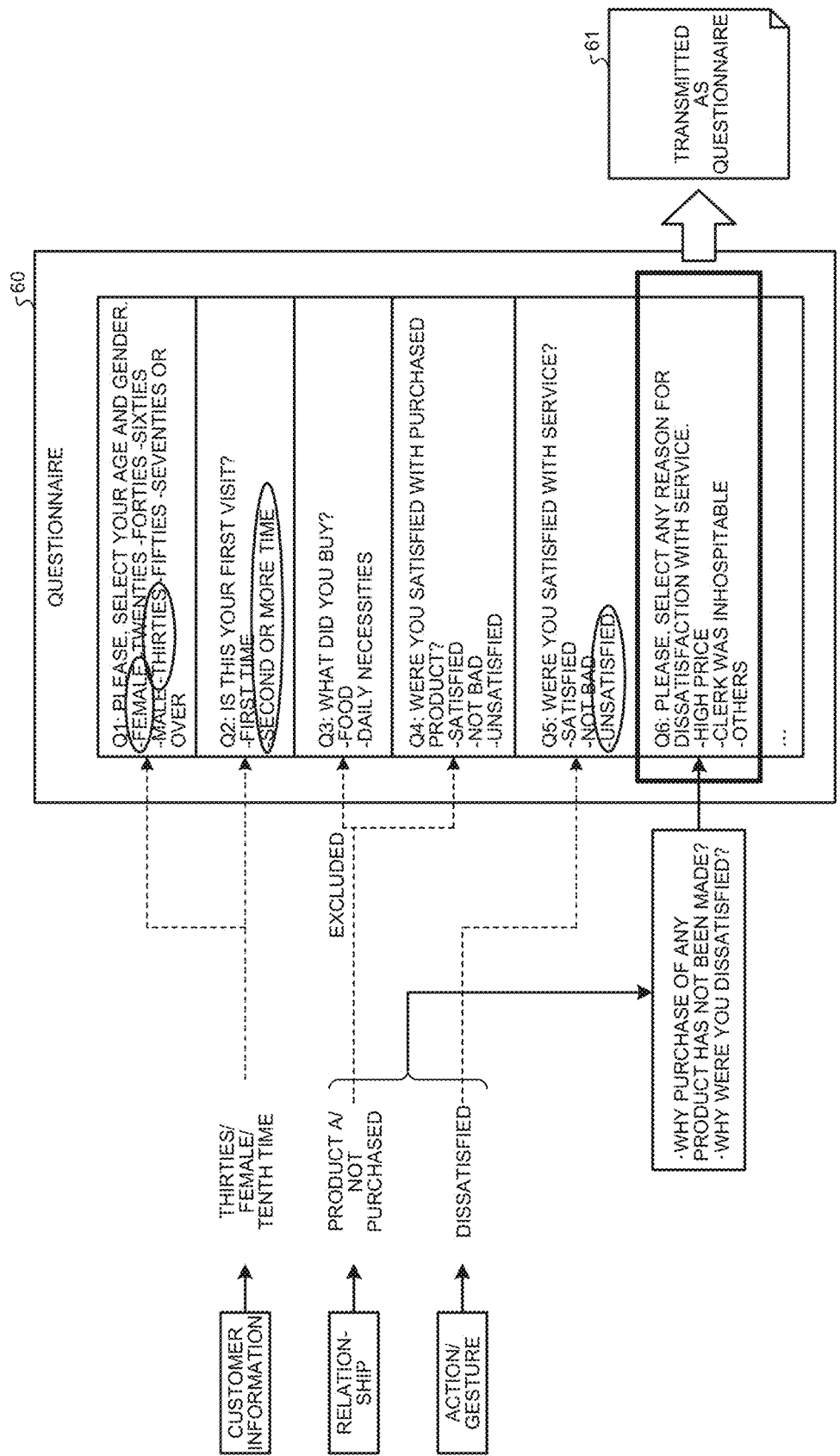
FIG. 14 is a diagram illustrating generation and transmission of a questionnaire.

FIG. 14 is a diagram illustrating generation and transmission of the questionnaire. As illustrated in FIG. 14, the evaluation acquisition unit 44 automatically inputs "thirties and female" to the "age and gender" of Questionnaire Q1 and automatically inputs "second or more time" to "Is this your first visit?" of Questionnaire Q2 using the customer information (thirties, female, and the number of visits (tenth time)) acquired by the acquisition unit 41.

In addition, the evaluation acquisition unit 44 excludes Questionnaire Q3 inquiring about the product purchase status and Questionnaire Q4 inquiring about a satisfaction level of a purchased product from the questionnaire using the relationship "Product A, not purchased" between the customer and the product identified by the relationship identification unit 42. The evaluation acquisition unit 44 automatically inputs "unsatisfied" to "Were you satisfied with service?" of Questionnaire Q5 using the action and gesture "dissatisfied" identified by the action recognition unit 43.

Further, the evaluation acquisition unit 44 identifies "why a purchase of any product has not been made" using the relationship "Product A, not purchased" between the customer and the product identified by the relationship identification unit 42 and the action and gesture identified by the action recognition unit 43. That is, the evaluation acquisition unit 44 determines that "why" corresponds to the psychological evaluation of the customer. As a result, the evaluation acquisition unit 44 selects "Please, select any reason for dissatisfaction with service" of Q6 corresponding to "why" as a partial questionnaire 61 among the items included in the questionnaire, and transmits the partial questionnaire 61 to a "notification destination" stored in the customer DB 13.

Then, when receiving an answer "clerk was inhospitable" for the partial questionnaire 61, the evaluation acquisition unit 44 determines the psychological evaluation of the customer as "clerk was inhospitable". Incidentally, the evaluation acquisition unit 44 can also determine which questionnaire item is to be selected for a partial questionnaire by using management data in which at least one of 5W1H is associated with each combination of a relationship identification result and an action recognition result. In addition, in general, the questionnaire of "why" is the most desired information, and thus, the evaluation acquisition unit 44 can also transmit only the questionnaire item corresponding to the questionnaire of "why" as the partial questionnaire.

The registration unit 45 is a processing unit that registers, in the analysis result DB 19, information. related to the relationship between the customer 5 and the product identified by the relationship identification unit 23 and the psychological evaluation of the customer 5 acquired by the evaluation acquisition unit 44 in association with each other. Specifically, the registration unit 45 registers information related to the identified time, location, and relationship in the analysis result DB 19 in association with an answer result of the partial questionnaire.

Figure 15:
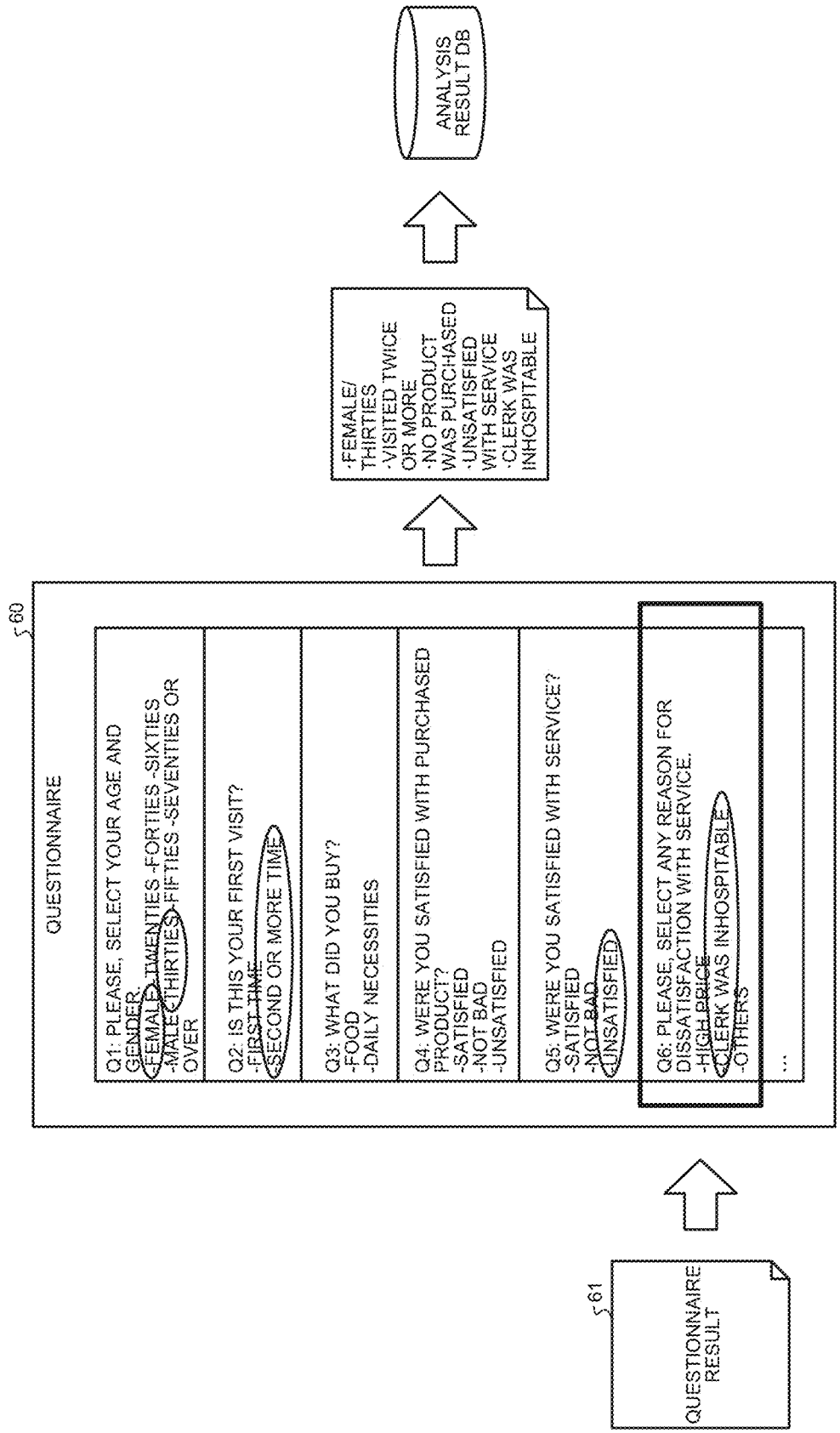
FIG. 15 is a diagram illustrating registration of an analysis result.

FIG. 15 is a diagram illustrating registration of an analysis result. As illustrated in FIG. 15, the registration unit 45 acquires "female, thirties, visited twice or more, and unsatisfied with service" automatically input by the evaluation acquisition unit 44 among items of the questionnaire, and acquires a result "clerk was inhospitable" of the partial questionnaire 61. Then, the registration unit 45 registers "female, thirties, visited twice or more, unsatisfied with service, and clerk was inhospitable" thus acquired in the analysis result DB 19.

Incidentally, the registration unit 45 can also register, in the analysis result DB 19, various types of information such as time of a frame in video data whose relationship has been identified by the relationship identification unit 42, a location of the camera 2 that has captured the video data, and the like. For example, the registration unit 45 can register the time "13:00", the location "Product shelf YY", information regarding relationships "held Product A in the hand", "stopped at Product shelf YY", and the like in the analysis result DB 19. In addition, the registration unit 45 can also register only the customer information and the answer result of the partial questionnaire in The analysis result DB 19. That is, the registration unit 45 can register an arbitrary analysis item desired by a user.

Flow of Processing

Figure 16:
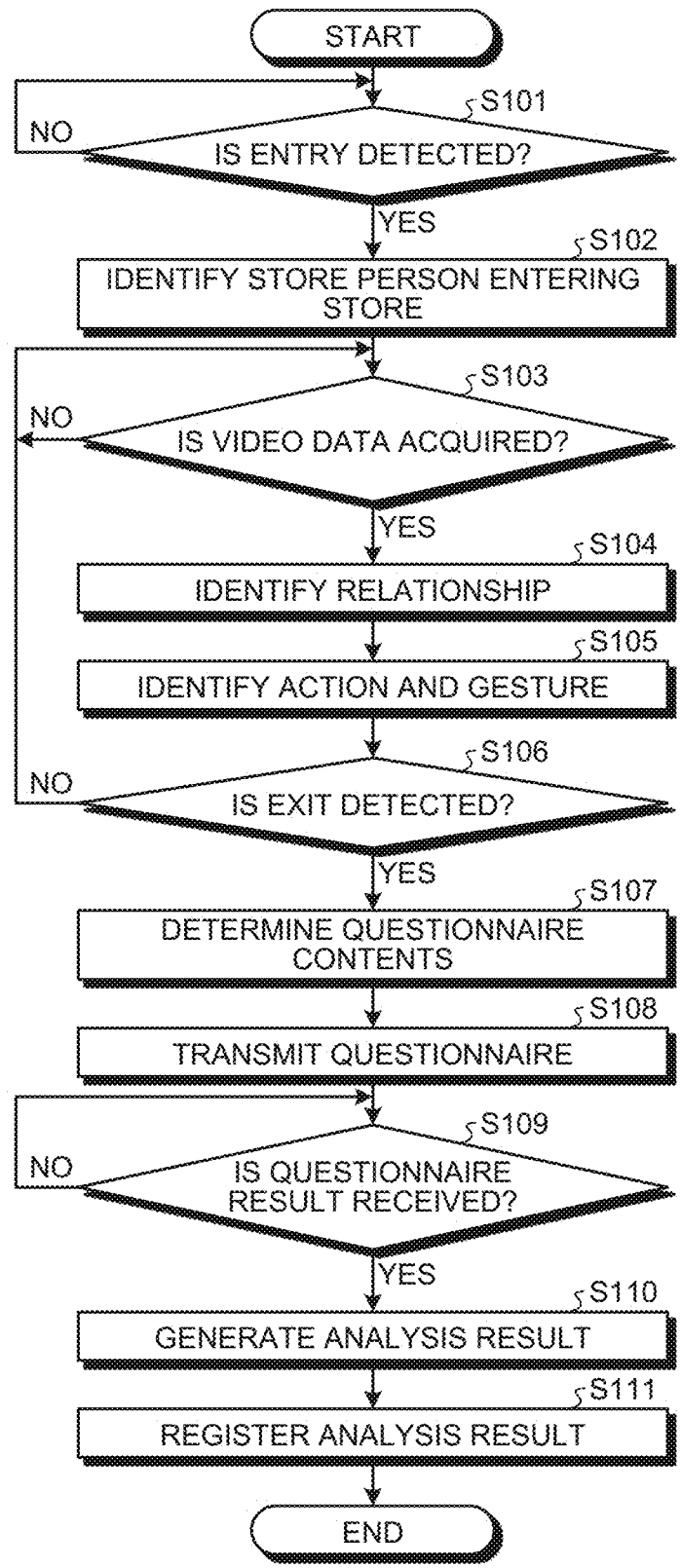
FIG. 16 is a flowchart illustrating a flow of processing according to the second embodiment.

FIG. 16 is a flowchart illustrating a flow of processing according to the second embodiment. Incidentally, processing from when one customer enters the store to when the customer leaves the store will be described here as an example, but the operation processing unit 40 is not required to follow one customer, and can execute the above-described processing using each video data captured by each of the cameras 2. In that case, the operation processing unit 40 can distinguish each customer by recognizing each person appearing in the video data at the time of entry and assigning an identifier or the like. In addition, it is assumed that pre-processing has been completed.

As illustrated in FIG. 16, when an entry of the customer 5 is detected (S101: Yes), the operation. processing unit 40 of The information processing apparatus 10 identifies a person entering the store and acquires customer information (S102).

Subsequently, when the video data is acquired (S103: Yes), the operation processing unit 40 identifies a relationship between the customer and a product using the video data and the relationship model 17 (S104), and identifies an action and a gesture of the customer with respect to the product using the video data and the action recognition model 18 (S105).

Thereafter, S103 and subsequent steps are repeated until exit is detected (S106: No), and when the exit is detected (S106: Yes), the operation processing unit 40 determines questionnaire contents using the identified relationship, action, and gesture (S107).

Then, the operation processing unit 40 transmits the questionnaire (partial questionnaire 61) inquiring about the determined questionnaire contents (S108), and when receiving a questionnaire result (S109: Yes), generates an. analysis result (S110), and registers the analysis result in the analysis result DB 19 (S111).

Effect

As described above, the information processing apparatus 10 can automatically input most items among items of the questionnaire from the video data, and transmit only questionnaire items that are not identifiable from the video data. Therefore, the information processing apparatus 10 can realize an increase in the number of customers who answer the questionnaire by mitigating the burden on the customers, collect more useful information, and reduce the amount of processing required to construct. the database.

In addition, the information processing apparatus 10 can realize pinpoint questionnaire transmission, and thus, can reduce the questionnaire repellency of a responder and improve a response rate.

(b) Second Embodiment

Meanwhile, the example of using a model for HOID has been described as the example of identifying a relationship between a customer and a product in the first embodiment, but the present invention is not limited thereto, and a scene graph which is an example of graph data indicating a relationship between targets included in video data can also be used.

Therefore, in a second embodiment, an example in which a relationship identification unit 42 of an operation processing unit 40 identifies a relationship between a customer and a product using a scene graph will be described. The scene graph is graph data in which objects (a person, a product, and the like) included in each piece of image data in video data and a relationship between the objects are described.

Figure 17:
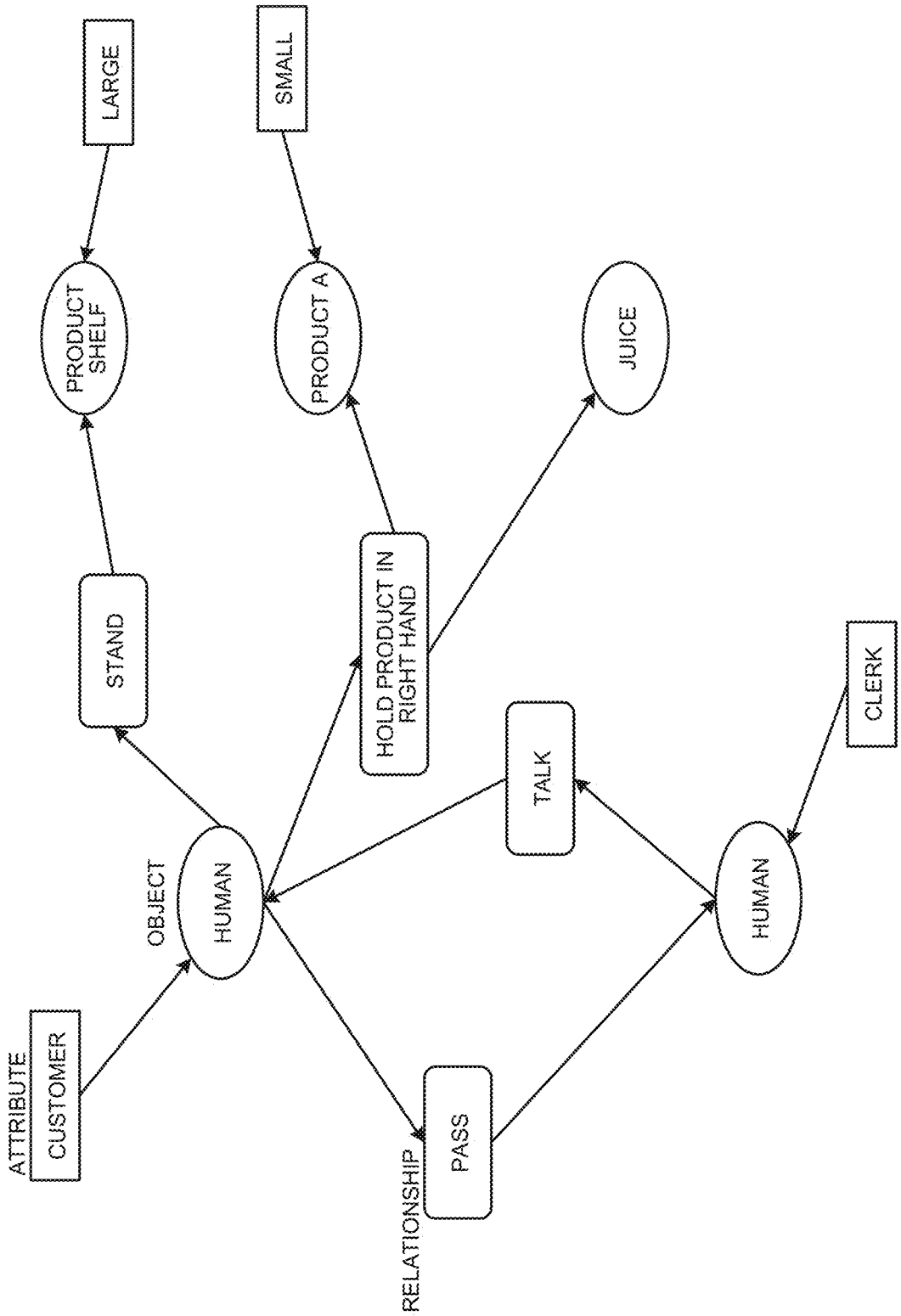
FIG. 17 is a diagram illustrating an example of a scene graph.

FIG. 17 is a diagram illustrating an example of a scene graph. As illustrated in FIG. 17, the scene graph is a directed graph in which objects appearing in image data are set as nodes, each of the nodes has an attribute (for example, an object type), and a relationship between the nodes is set as a directed edge. The example of FIG. 17 illustrates that there is a relationship "talk" between a node "human" of an attribute "clerk" and a node "human" of an attribute "customer". In other words, it is defined that "a clerk talks to a customer". In addition, it is illustrated that there is a relationship "stand" between the node "human" of the attribute "customer" and a node "product" of an attribute "large". That is, it is defined that "the customer stands in front of a product shelf of a large product".

The relationships described here are merely examples. For example, the relationship is not limited to a simple relationship such as "hold", but includes a complicated relationship such as "hold Product A in a right hand". Incidentally, each of a scene graph corresponding to a relationship between a human and a human and a scene graph corresponding to a relationship between people a human a thing may be stored, or one scene graph including the relationships may be stored. In addition, the scene graph is generated by a control unit 20 to be described later, but data generated in advance may be used.

Figure 18:
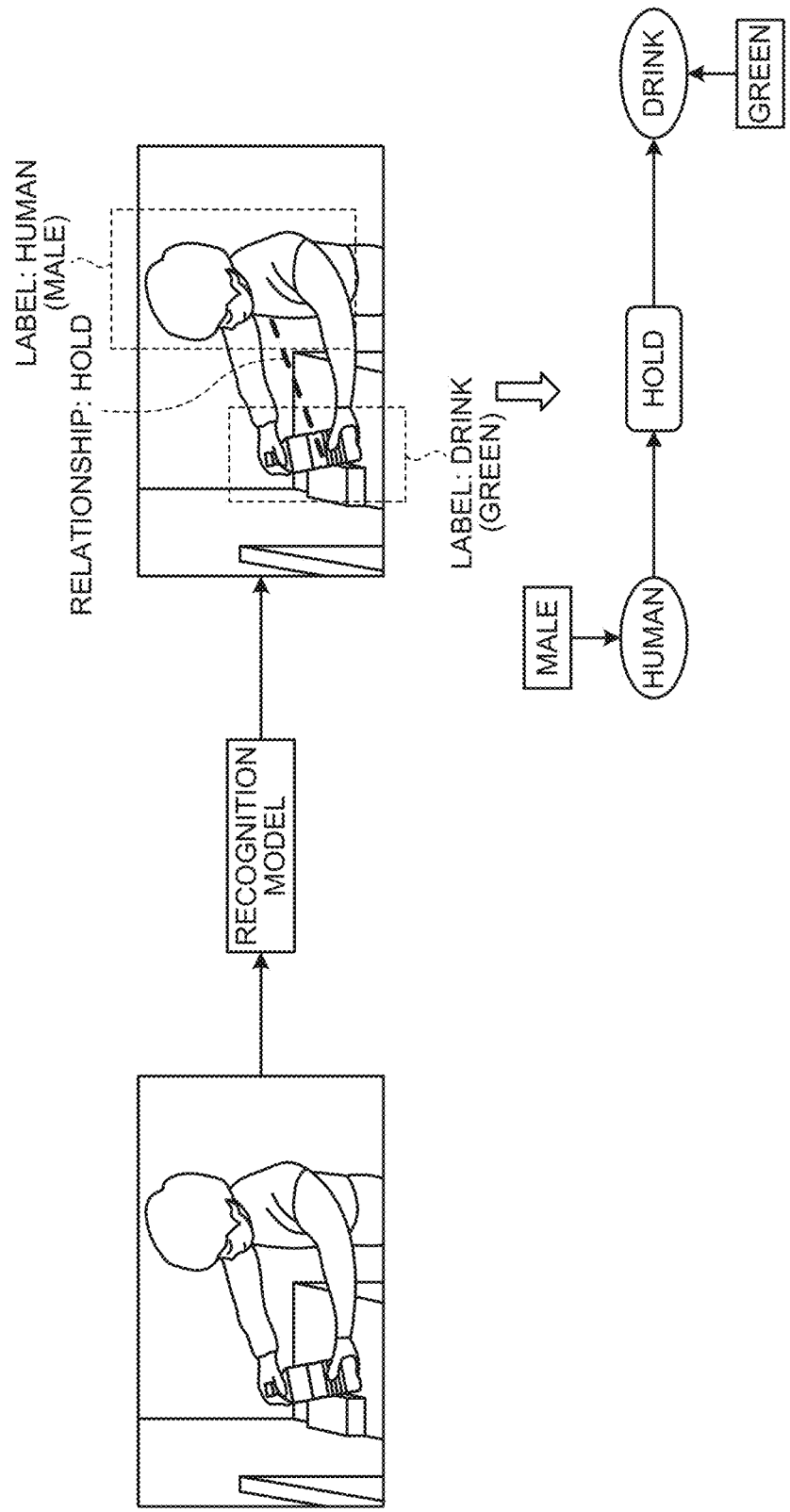
FIG. 18 is a diagram illustrating a generation example of a scene graph indicating a relationship between a human and a thing.

Next, generation of a scene graph will be described. FIG. 18 is a diagram illustrating a generation example of a scene graph indicating a relationship between a human and a thing. As illustrated in FIG. 18, a pre-processing unit 30 inputs image data to a trained recognition model, and acquires a label "human (male)", a label "drink (green)", and a relationship "hold" as output results of the recognition model. That is, the pre-processing unit 30 acquires that "a male holds a green drink". As a result, the pre-processing unit 30 generates a scene graph that associates the relationship "hold" between a node "human" having an attribute "male" to a node "drink" having an attribute "green". Incidentally, the generation of the scene graph is merely an example, and other methods can also be used, and manual generation by an administrator or the like is also possible.

Next, identification of a relationship using a scene graph will be described. The relationship identification unit 42 executes a relationship identification process of identifying a relationship between a person and a person or a relationship between a person and a thing appearing in video data according to the scene graph. Specifically, for each of frames included in the video data, the relationship identification unit 42 identifies a human type and a type of the thing appearing in the frame and searches the scene graph using each identified information to identify the relationship. Then, the relationship identification unit 42 outputs the identified relationship to each processing unit.

Figure 19:
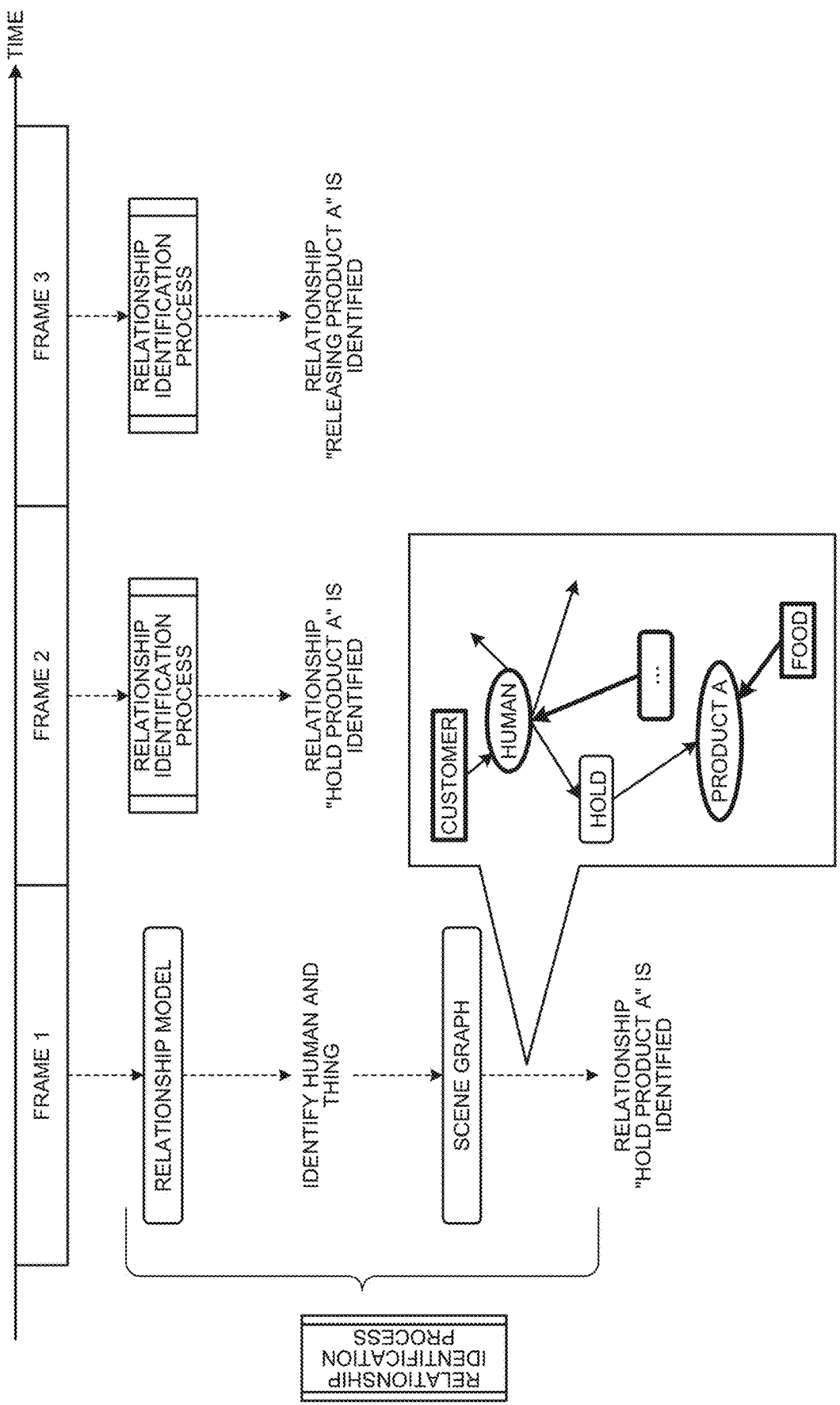
FIG. 19 is a diagram illustrating identification of a relationship using a scene graph.

FIG. 19 is a diagram illustrating identification of a relationship using a scene graph. As illustrated in FIG. 19, the relationship identification unit 42 identifies a human type, a type of a thing, the number of persons, and the like in Frame 1 by using a result obtained by inputting Frame 1 into a machine learning model subjected to machine learning or by publicly known image analysis on Frame 1. For example, the relationship identification unit 42 identifies "human (customer)" as the human type and "product (Product A)" as the type of thing. Thereafter, the relationship identification unit 42 identifies a relationship "a human (customer) has a product (Product A)" between a node "human" of an attribute "customer" and a node "Product A" of an attribute "food" according to the scene graph. The relationship identification unit 42 executes the above-described relationship identification process for each subsequent frame, such as Frame 2 and Frame 3, to identify a relationship for each frame.

As described above, an information processing apparatus 10 according to the second embodiment can easily determine a relationship suitable for a store using the scene graph generated for each store, for example, without performing relearning according to the store such as a machine learning model. Therefore, the information processing apparatus 10 according to the second embodiment can easily execute introduction of a system and the like in the present embodiment.

(c) Third Embodiment

Incidentally, as the above-described action recognition model 18, a machine learning model that performs classification into binary classes can also be used in addition to a machine learning model that recognizes an action and a gesture of a person from video data. That is, as the action recognition model 18, the model that detects a "hesitating" action corresponding to an action or a gesture of a questionnaire transmission target can be used.

Figure 20:
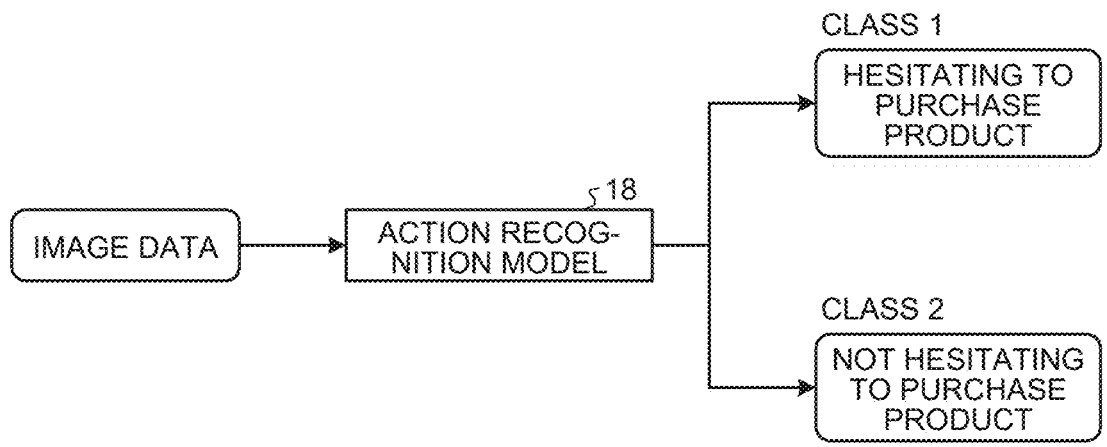
FIG. 20 is a diagram illustrating an action recognition model according to a third embodiment.

FIG. 20 is a diagram illustrating an action recognition model 18 according to a third embodiment. As illustrated in FIG. 20, in response to an input of image data, the action recognition model 18 determines two values of Class 1 "hesitating to purchase product" and Class 2 "not hesitating to purchase product". Incidentally, an output result of the action recognition model 18 includes the degree of reliability (for example, a probability value) of each class.

Figure 21:
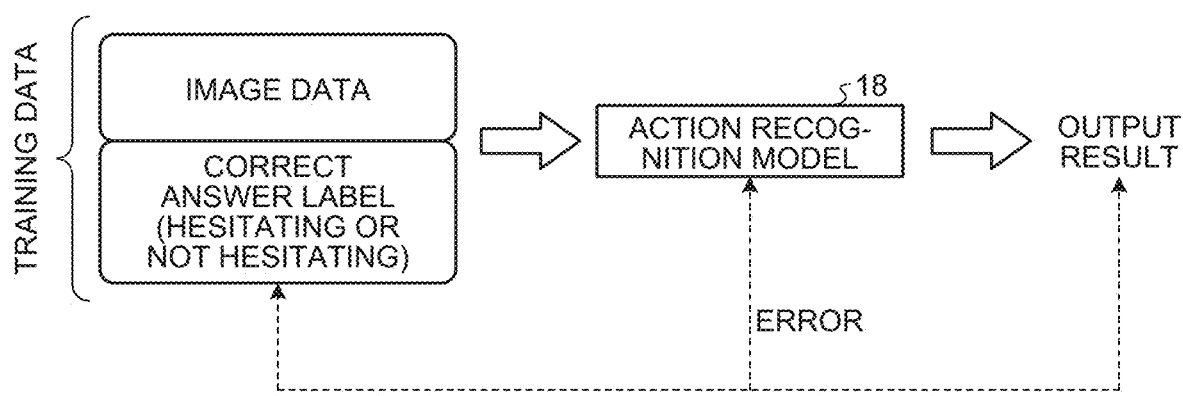
FIG. 21 is a diagram illustrating machine learning of the action recognition model according to the third embodiment.

Next, training of the action recognition model 18 according to the third embodiment will be described. FIG. 21 is a diagram illustrating machine learning of the action recognition model 18 according to the third embodiment. As illustrated in FIG. 21, a pre-processing unit 30 inputs "image data" in which a state where a person is selecting a product appears as an explanatory variable, and training data having "hesitating" or "not hesitating" as a correct answer label which is an objective variable to the action recognition model 18, and acquires an output result of the action recognition model 18. Thereafter, the pre-processing unit 30 updates parameters of the action recognition model 18 so as to reduce an error between the output result of the action recognition model 18 and the correct answer label. In this manner, the pre-processing unit 30 executes the training of the action recognition model 18 and generates the action recognition model 18.

Figure 22:
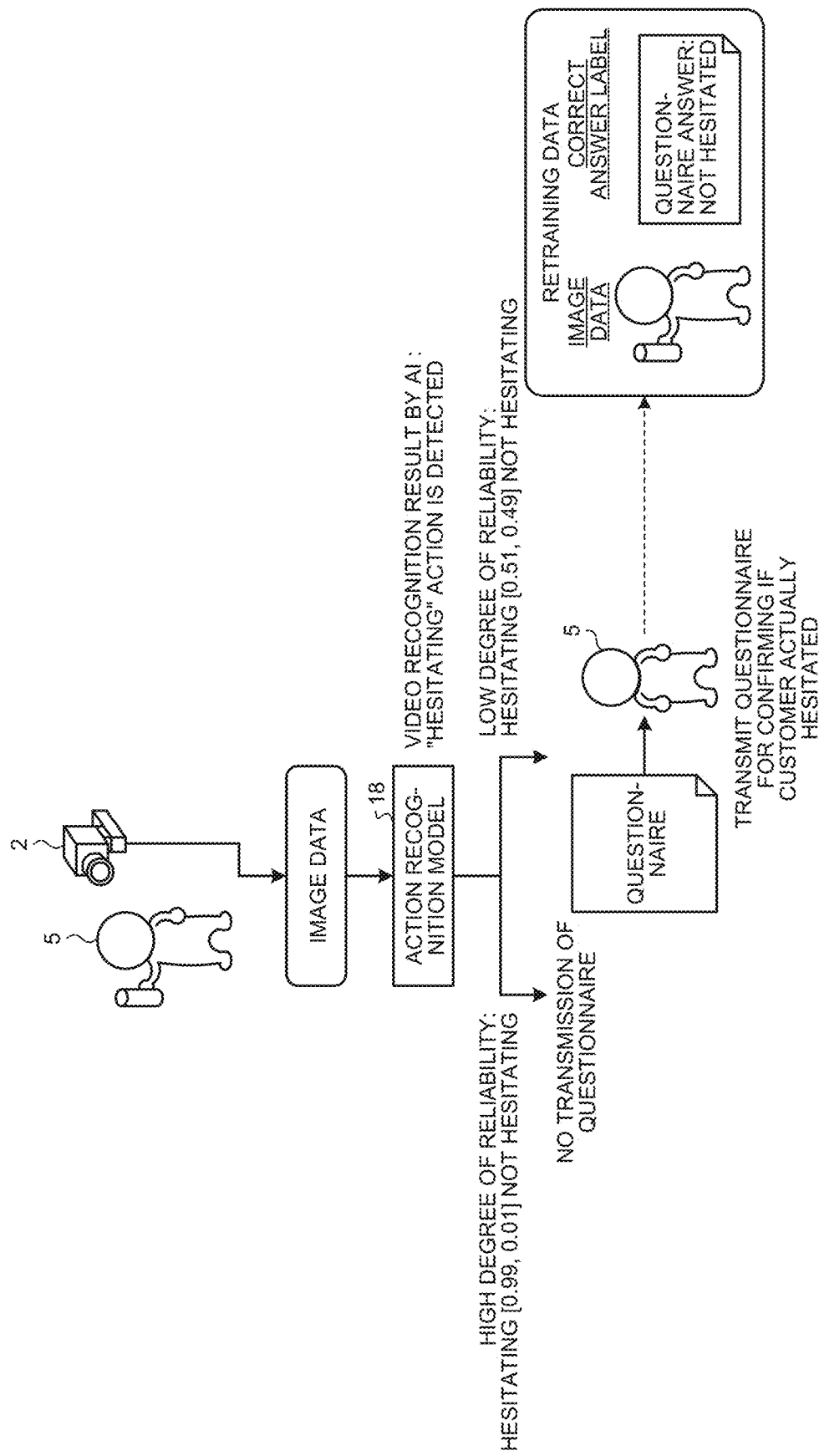
FIG. 22 is a diagram illustrating questionnaire transmission using the action recognition model according to the third embodiment.

Next, questionnaire transmission will be described using the trained action recognition model 18. FIG. 22 is a diagram illustrating the questionnaire transmission using the action recognition model 18 according to the third embodiment. As illustrated in FIG. 22, an operation processing unit 40 inputs each of frames in video data captured by a camera 2 to the action recognition model 18 and acquires an output result of the action recognition model 18.

Then, in a case where Class 1 "hesitating" is acquired as the output result of the action recognition model 18, a difference between a degree of reliability of Class 1 "hesitating" and a degree of reliability of Class 2 "not hesitating" is equal to or larger than a threshold, and the output result has a high degree of reliability, the operation processing unit 40 suppresses the questionnaire transmission.

On the other hand, in a case where Class 1 "hesitating" is acquired as the output result of the action recognition model 18, a difference between a degree of reliability of Class 1 "hesitating" and a degree of reliability of Class 2 "not hesitating" is smaller than a threshold, and the output result has a low degree of reliability, the operation processing unit 40 executes the questionnaire transmission. Incidentally, in a case where Class 2 "not hesitating" is acquired as the output result of the action recognition model 18, the operation processing unit 40 executes the questionnaire transmission regardless of a difference in the degree of reliability.

That is, the operation. processing unit 40 controls the questionnaire transmission according to the degree of reliability in a case where Class 1 "hesitating" is identified.

Furthermore, the operation processing unit 40 can also generate retraining date using a questionnaire result. For example, it is assumed that the operation processing unit 40 has executed questionnaire transmission and has received "not hesitating" as a questionnaire answer since an output result obtained by inputting Image data AA to the action recognition model 18 is Class 1 "hesitating" and has a low degree of reliability. In this case, the operation processing unit 40 can generate training data for retraining having "Image data AA" as an explanatory variable and "not hesitating" as an objective variable. The pre-processing unit 30 can improve recognition accuracy of the action recognition model 18 by executing retraining of the action recognition model 18 using the training data for retraining.

Incidentally, the questionnaire transmitted here may be the above-described partial questionnaire 61. For example, when a recognition result is "Class 1 "hesitating" with a high degree of reliability", which is an example of a first condition, the operation processing unit 40 registers an analysis result using the automatic acquisition described in the first embodiment. On the other hand, when a recognition result is "Class 1 "hesitating" with a low degree of reliability" or "Class 2 "not hesitating"", which is an example of a second condition, the operation processing unit 40 registers an analysis result using the automatic acquisition and the answer result of the partial questionnaire described in the first embodiment.

In addition, the transmitted questionnaire may be the entire questionnaire described in the first embodiment, or may be another question information prepared in advance. That is, the operation processing unit 40 can also transmit the questionnaire 60 only in a case where the action recognition model 18 of the third embodiment detects Class 1 "hesitating" with a high degree of reliability without executing the relationship identification process, the action and gesture identification process, and the like of the first embodiment.

In addition, not only the binary classification but also the action recognition model 18 that performs multi-class classification can be used. For example, the action recognition model 18 performs multi-class classification including Class 1 "very hesitating", Class 2 "hesitating", Class 3 "not hesitating", Class 4 "none of these", and the like. In this case, if a difference between a class having the highest degree of reliability and a class having the second highest degree of reliability is equal to or larger than a threshold, the action recognition model 18 registers an analysis result using the automatic acquisition described in the first embodiment. On the other hand, in a case where the difference between the class having the highest degree of reliability and the class having the second highest degree of reliability is smaller than the threshold, the action recognition model 18 registers an analysis result using the automatic acquisition and the answer result of the partial questionnaire described in the first embodiment.

In this manner, an information processing apparatus 10 according to the third embodiment can control the questionnaire transmission according to the degree of reliability or a recognition result of the action recognition model 18, and thus, it is possible to acquire a user evaluation by the questionnaire not only in a state where a psychological evaluation of a customer is bad but also in a state where the psychological evaluation of the customer is slightly bad. As a result, the information processing apparatus 10 can collect an accurate analysis result.

(d) Fourth Embodiment

Meanwhile, for example, there is a case where it is desired to conduct a questionnaire intended for individuals by narrowing down conditions such as elderly people and dissatisfied customers. In a case of an automatic questionnaire that does not involve human intervention, the questionnaire intended for individuals can be conducted if the questionnaire can be sent to a personal terminal such as a smartphone, but there is a case where it is difficult to send the questionnaire to the personal terminal because personal information of a visitor is unknown in a retail store or the like. Even in such a case, an information processing apparatus 10 can transmit the questionnaire not only to a terminal of a customer but also to an arbitrary location.

Figure 23:
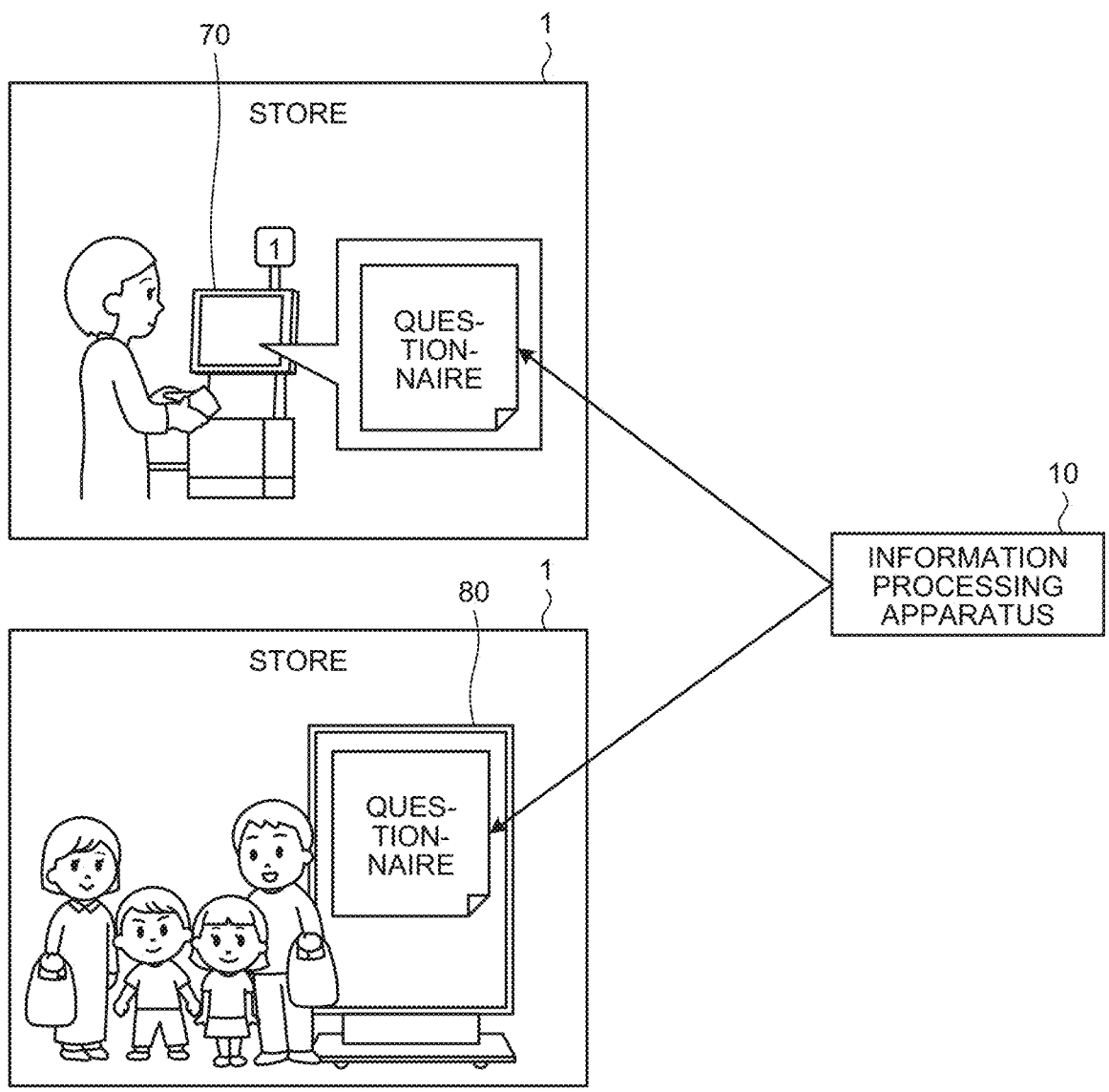
FIG. 23 is a diagram illustrating questionnaire transmission according to a fourth embodiment.

FIG. 23 is a diagram illustrating questionnaire transmission according to a fourth embodiment. As illustrated in FIG. 23, an operation processing unit 40 of the information processing apparatus 10 can transmit a questionnaire 60 or a partial questionnaire 61 to a display of self-checkout 70 or signage 80 of the store 1.

However, in a case where the questionnaire intended. for individuals is conducted using a facility of the store 1 such as digital signage with a touch function, there is a possibility that a visitor different from a target person answers the questionnaire so that the questionnaire narrowing down conditions is not established.

Therefore, the information processing apparatus 10 displays a screen for answering the questionnaire on the signage only in a situation where only the target person can answer the questionnaire by using each positional relationship among signage for answering the questionnaire, the questionnaire target person, and a surrounding person other than the target person, and information of a posture of each person, and encourages the target person to answer the questionnaire.

For example, the information processing apparatus 10 analyzes a video obtained by capturing a first area including a customer or a product, thereby identifying a state of the customer with respect the product among a plurality of persons included in the video. The information processing apparatus 10 generates a Questionnaire related to the customer or the product based on the state of the customer with respect to the product. Then, the information processing apparatus 10 identifies a position and an orientation of each of the plurality of customers with respect to the signage by analyzing a video obtained by capturing a second area including the signage. Thereafter, the information processing apparatus 10 causes the signage to display a questionnaire for a specific customer when the specific customer is in the state of being closest to the signage and faces the signage and another customer is away from the specific customer and does not face the signage based on the identified positions and orientations.

Figure 24:
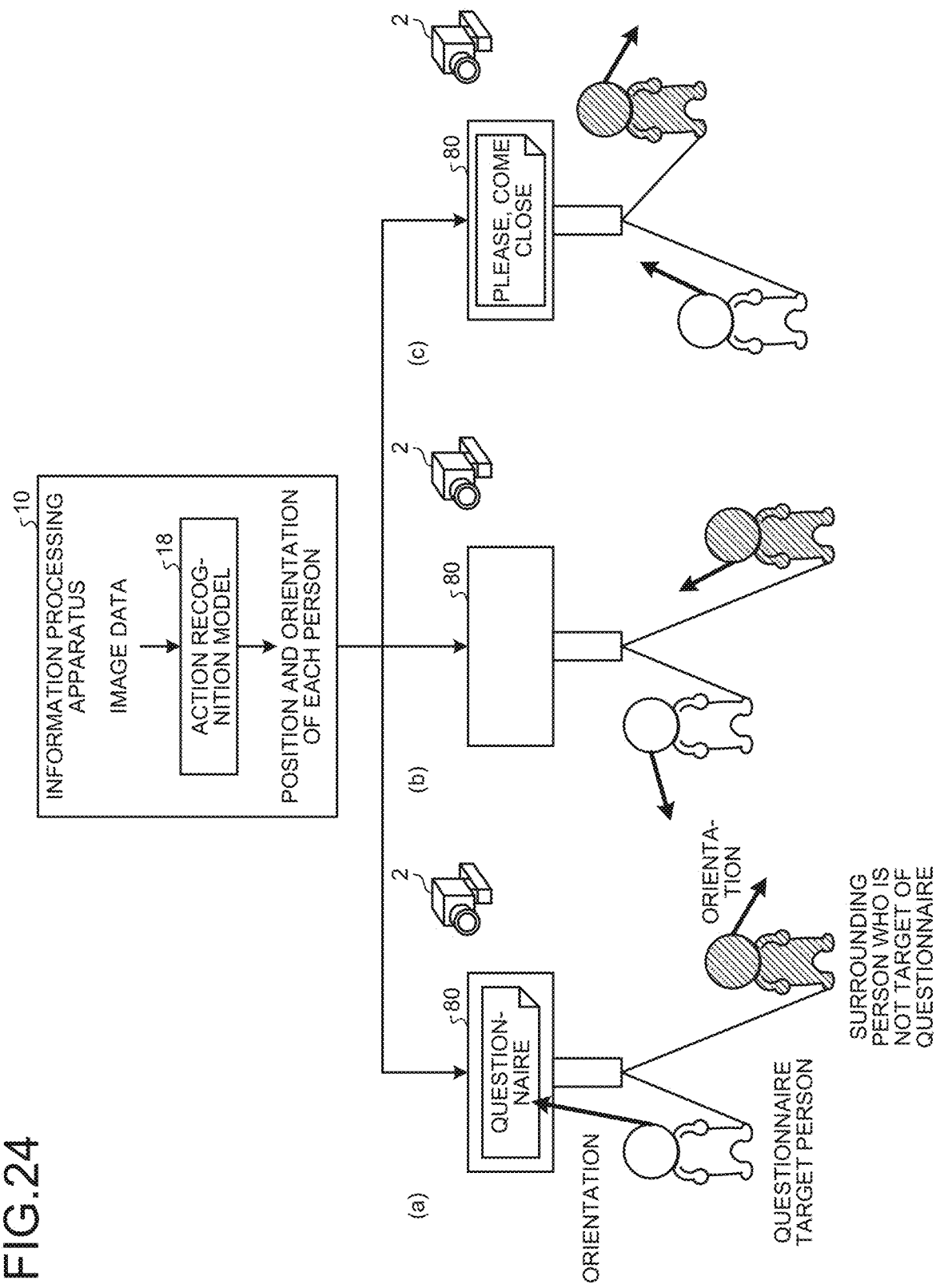
FIG. 24 is a diagram illustrating a specific example of the questionnaire transmission according to the fourth embodiment.

FIG. 24 is a diagram illustrating a specific example of questionnaire transmission according to the fourth embodiment. As illustrated in FIG. 24, the operation processing unit 40 of the information processing apparatus 10 inputs each piece of image data (each frame) in video data to an action recognition model 18, and identifies positions and orientations of persons appearing in the respective pieces of image data. Here, from a processing result of a relationship identification unit 42, the operation processing unit 40 identifies a customer holding a product in a hand, a customer having made a payment, and a customer having stayed in front of a product shelf for a certain period of time or more as questionnaire target persons (specific customers).

Then, as illustrated in of FIG. 24, the operation processing unit 40 displays the questionnaire on the signage 80 in a case where it has been identified that the questionnaire target person faces the signage 80 and is at a position in a case where the signage 80 can be operated and a questionnaire non-target person does not face the signage 80 and is not at the position where the signage 80 can be operated based on the positions and orientations of the persons appearing in the respective pieces of image data.

On the other hand, as illustrated in (b) of FIG. 24, the operation processing unit 40 does not display the questionnaire on the signage 80 in a case where it has been identified that the questionnaire target person does not face the signage 80 and the questionnaire non-target person faces the signage 80 and is at the position where the signage 80 can be operated based on the positions and orientations of the persons appearing in the respective pieces of image data.

In addition, as illustrated in (c) of FIG. 24, the operation processing unit 40 displays a message to make the questionnaire target person come close to the signage 80 in a case where it has been identified that the Questionnaire target person faces the signage 80 but is not at the position where the signage 80 can be operated and the questionnaire non-target person does not face the signage 80 based on the positions and orientations of the persons appearing in the respective pieces of image data.

Figure 25:
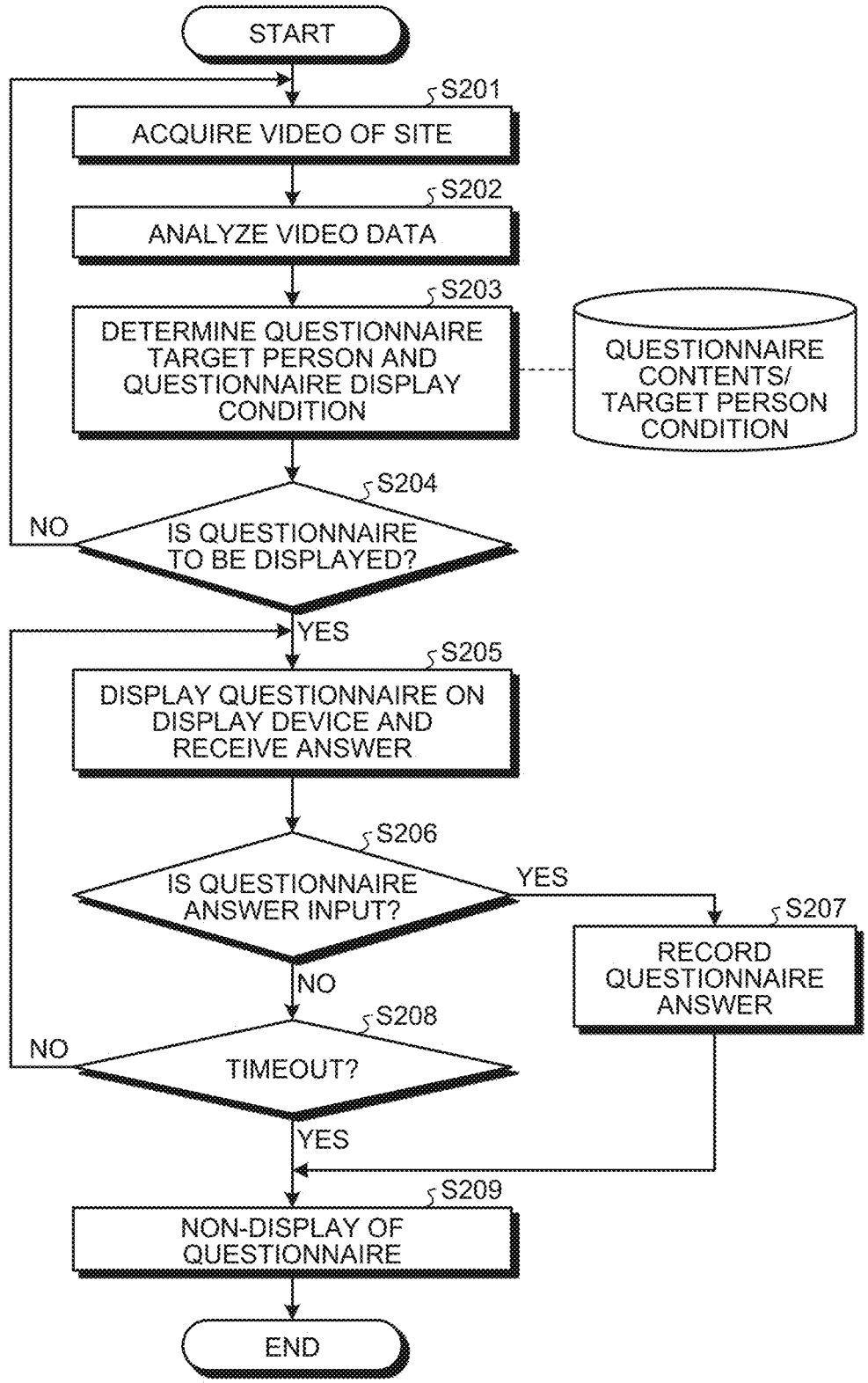
FIG. 25 is a flowchart illustrating a flow of processing according to the fourth embodiment.

FIG. 25 a flowchart illustrating a flow of processing according co the fourth embodiment. As illustrated in FIG. 25, the operation processing unit 40 acquires video data of a site (S201) and executes analysis of the video data (S202). For example, the operation processing unit 40 executes identification of a relationship, identification of a position and an orientation of a person, identification of an action and a gesture, and the like.

Subsequently, the operation processing unit 40 determines a questionnaire target person and a questionnaire display condition (S203). For example, the operation processing unit 40 reads predetermined questionnaire contents and target person condition, and determines whether or not the display condition is satisfied using an analysis result.

Here, when determining not to display the questionnaire (S204: No), the operation processing unit 40 repeats S201 and subsequent steps. On the other hand, when determining to display the questionnaire (S204: Yes), the operation processing unit 40 displays the questionnaire on a display device such as the signage 80 and receives an answer (S205).

Thereafter, when receiving an input of the questionnaire answer (S206: Yes), the operation processing unit 40 records the questionnaire answer (S207) and executes non-display of the questionnaire (S209). On the other hand, the operation processing unit 40 displays the questionnaire on the display device such as the signage 80 and receives an answer (S205) until reaching a timeout (S208: No) without receiving an input of any answer to questionnaire (S206: No). Incidentally, when the input of any answer to the questionnaire is not received (S206: No) and the timeout is reached. (S208: Yes), the operation. processing unit 40 executes the non-display of the questionnaire (S209).

Figure 26:
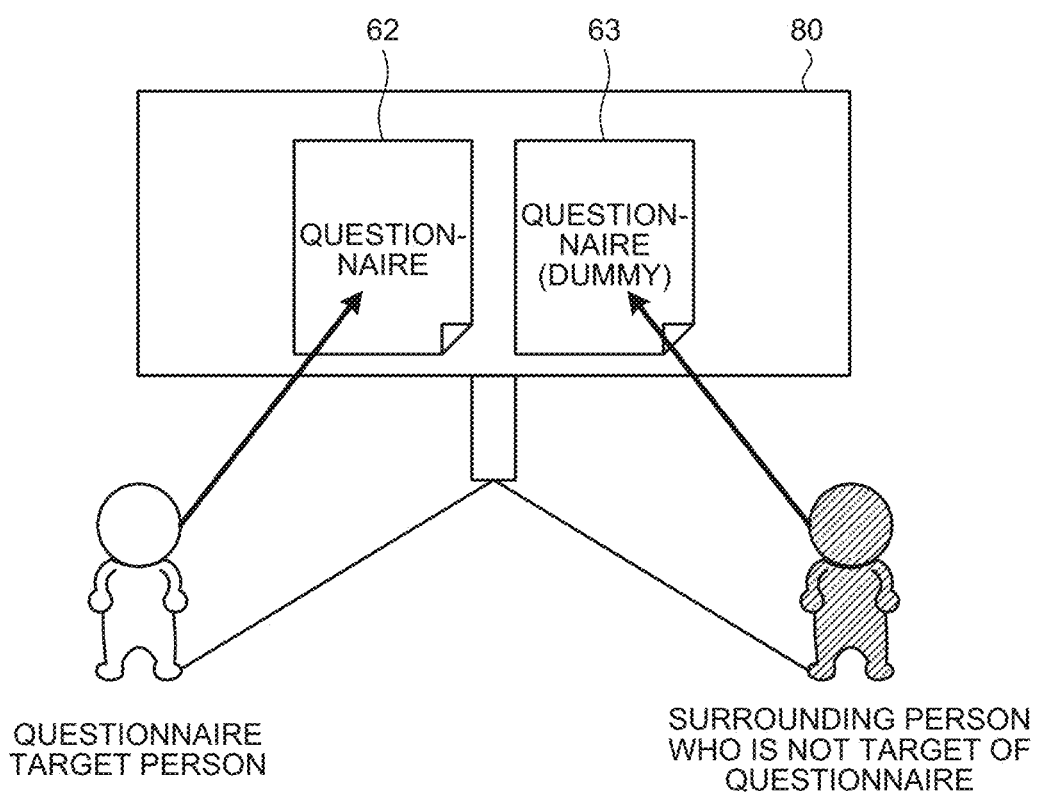
FIG. 26 is a diagram illustrating a questionnaire display example of signage according to the fourth embodiment.

Incidentally, the operation processing unit 40 can also display a dummy questionnaire that is not used for analysis particularly in a case of the signage 80 having a large screen or the like. FIG. 26 is a diagram illustrating a questionnaire display example of the signage according to the fourth embodiment.

As illustrated in FIG. 26, the operation processing unit 40 identifies each position and each orientation of a questionnaire target person and a questionnaire non-target person accord ng to the positions and orientations of the persons appearing in each piece of image data. Then, the operation processing unit 40 displays a questionnaire 62 in a region of the signage 80 facing the questionnaire target person, and displays a dummy questionnaire 63 in a region of the signage 80 facing the questionnaire non-target person.

Thereafter, the operation processing unit 40 registers an answer result of the questionnaire 62 as an analysis result, and discards an answer result of the dummy questionnaire 63. Incidentally, it is also advantageous to manage the answer result of the dummy questionnaire 63 as information of an accompanying person.

In this manner, the information processing apparatus 10 determines the signage 80 for answering the questionnaire and the positions and postures of the questionnaire target person and the surrounding person thereof using a video of a monitoring camera or the like. The information processing apparatus 10 displays the screen for answering the questionnaire on the signage 80 only under a condition that the person closest to the signage 80 for answering the questionnaire is the questionnaire target person, the target person has a body facing the signage 80, and there is no person having a body facing the signage 80 other than the target person. As a result, the information processing apparatus 10 can prevent a situation in which a person who is not the questionnaire target answers the questionnaire to degrade the answer quality.

(e) Fifth Embodiment

Although the embodiments of the invention have been described so far, the invention may be implemented in various different modes in addition to the embodiments described above.

Numerical Value, etc.

Numerical value examples, the number of cameras, label names, rule examples, action examples, state examples, and the like used in the above-described embodiments are merely examples, and can be arbitrarily changed. In addition, the flow of the processing described in each of the flowcharts can be appropriately changed within a range without contradiction. In addition, the store has been described as an example in the above-described embodiments, but the present invention is riot limited thereto, and can also be applied to, for example, a warehouse, a factory, a classroom, a car interior of a train, a cabin of an airplane, and the like.

System

Information including processing procedures, control procedures, specific terms, various types of data and parameters illustrated in the above document and drawings can be arbitrarily changed except the case of being particularly noted.

In addition, each component of each device illustrated in the drawings is functional and conceptual and does not need to be physically configured as illustrated in the drawings. That is, specific modes of distribution and integration of each device are not limited to those illustrated in the drawings. That is, all or a part thereof may be configured to be functionally or physically separated or integrated in arbitrary units depending on various loads, use situations, and the like.

Further, for each processing function to be performed by each device, all or any part of the processing functions may be implemented by a CPU and a program analyzed and executed by the CPU or may be implemented as hardware by wired logic.

Hardware of Information Processing Apparatus 10

Figure 27:
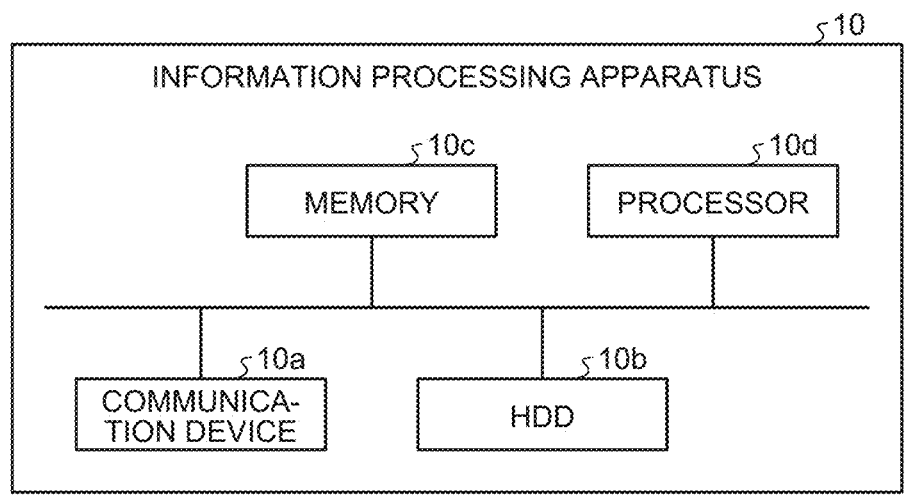
FIG. 27 is a diagram illustrating a hardware configuration example of the information processing apparatus.

FIG. 27 is a diagram illustrating a hardware configuration example of an information processing apparatus 10. As illustrated in FIG. 27, the information processing apparatus 10 includes a communication device 10a, a hard disk drive (HDD) 10b, a memory 10c, and a processor 10d. In addition, the respective units illustrated in FIG. 27 are mutually connected by a bus or the like.

The communication device 10a is a network interface card or the like and communicates with other devices. The HDD 10b stores a program and a DB for operating the functions illustrated in FIG. 4.

The processor 10d reads a program for executing processing similar to that of each processing unit illustrated in FIG. 4 from the HDD 10b or the like and develops the read program in the memory 10c, thereby operating the process of executing each function described in FIG. 4 and the like. For example, this process executes functions similar to the respective processing units of the information processing apparatus 10. More specifically, the processor 10d reads the program having the functions similar to those of the pre-processing unit 30, the operation processing unit 40, and the like from the HDD 10b or the like. Then, the processor 10d executes a process of executing the processing similar to that of the pre-processing unit 30, the operation processing unit 40, or the like.

In this manner, the information processing apparatus 10 operates as an information processing apparatus that executes an information processing method by reading and executing the program. In addition, the information processing apparatus 10 can also realize the functions similar to those in the above-described embodiments by reading the above-described programs from a recording medium by a medium reading device and executing the read program. Incidentally, the program referred to in the other embodiments is not limited to being executed by the information processing apparatus 10. For example, the above-described embodiments can be similarly applied when another computer or server executes the program, or when these computer and server execute the program in cooperation.

The program may be distributed via a network such as the Internet. In addition, this program may be recorded on a computer-readable recording medium such as a hard disk, a flexible disk (FD), a CD-ROM, a magneto-optical disk (MO), or a digital versatile disc (DVD), and may be executed by being read from the recording medium by the computer.

Hardware of Signage 80

Figure 28:
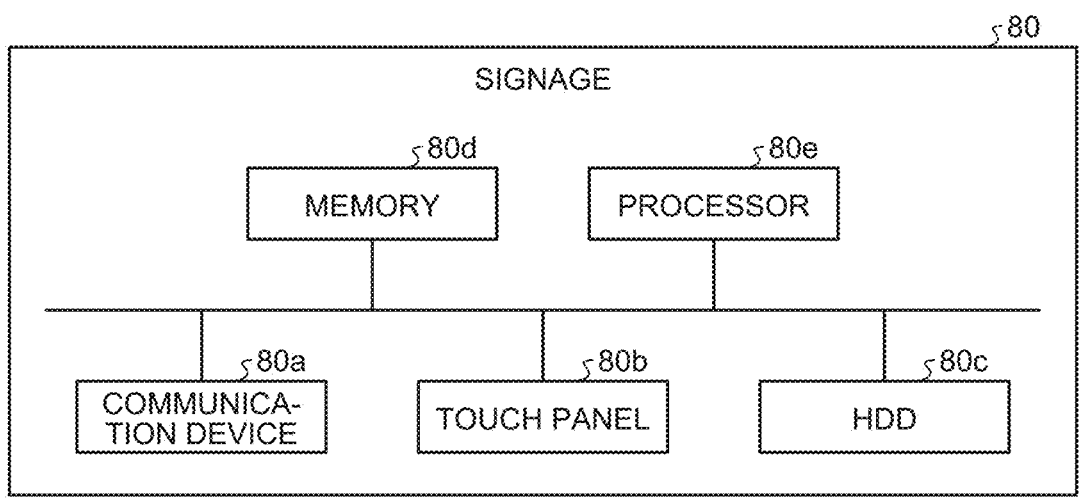
FIG. 28 is a diagram illustrating a hardware configuration example of the signage.

FIG. 28 is a diagram illustrating a hardware configuration example of signage 80. As illustrated in FIG. 28, the signage 80 includes a communication device 80a, a touch panel 80b, an HDD 80c, a memory 80d, and a processor 80e. In addition, the respective units illustrated in FIG. 28 are mutually connected by a bus or the like.

The communication device 80a is a network interface card or the like and communicates with other devices. The touch panel 80b displays a questionnaire and receives answers to the questionnaire. The HDD 80c stores various programs and databases.

The processor 80e reads a program for executing processing similar to the processing described in the fourth embodiment from the HDD 80c or the like and develops the program in the memory 80d, thereby operating a process of executing each processing. For example, this process executes functions similar to reception of a questionnaire, display of a questionnaire, and reception of an answer to a questionnaire.

In this manner, the signage 80 operates as an information processing apparatus that executes a display method by reading and executing the program. In addition, the signage 80 can also realize the functions similar to those in the above-described embodiments by reading the above-described programs from a recording medium by a medium reading device and executing the read program. Incidentally, the program referred to in the other embodiments is not limited to being executed by the signage 80. For example, the above-described embodiments can be similarly applied when another computer or server executes the program, or when these computer and server execute the program in cooperation.

The program may be distributed via a network such as the Internet. In addition, this program may be recorded on a computer-readable recording medium such as a hard disk, a flexible disk, a CD-ROM, an MO, or a DVD, and may be executed by being read from the recording medium by a computer.

According to one embodiment, it is possible to reduce the amount of processing required to construct the database.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a display control program that causes a computer to execute a process comprising: identifying a relationship between a specific user and an object among a plurality of persons included in video data by analyzing the video data obtained by capturing a first area including the specific user and the object; generating a questionnaire related to the specific user or the object, and including an item that is not identifiable from the video data based on the identified relationship; identifying positions and orientations of users among the plurality of persons with respect to a display device by analyzing video data obtained by capturing a second area including the display device; and displaying the questionnaire related to the specific user on the display device to acquire an answer result from the specific user when the specific user is in a state of being closest to the display device and facing the display device and another user is away from the specific user and from the display device and does not face the display device based on the identified positions and orientations; and registering the identified relationship and the acquired answer result in association with each other in a database.

2. The non-transitory computer-readable recording medium according to claim 1, wherein the process further includes identifying the relationship between a person and an object in an action of the specific user with respect to the object by inputting the video data, obtained by capturing the first area where the object is arranged, into a machine learning model; acquiring a psychological evaluation of the person with respect to the object for which the relationship has been identified; and registering a result related to the identified relationship and the psychological evaluation of the person in association with each other in a database indicating an analysis result of the object, the database being stored in a storage.

3. The non-transitory computer-readable recording medium according to claim 2, wherein the identifying includes identifying information, related to time and a location at which the action is performed and the relationship, from the action of the specific user included in the video data with respect to the object; the acquiring includes transmitting the questionnaire, related to a psychological index of the specific user regarding the object, to a terminal associated with the specific user, and acquiring an answer result of the questionnaire received from the terminal as the psychological evaluation of the person; and the registering includes registering the acquired answer result of the questionnaire in the database indicating the analysis result of the object in association with the result related to the relationship.

4. The non-transitory computer-readable recording medium according to claim 2, wherein the machine learning model is a model for human object interaction detection (HOID) generated by machine learning to identify a first class indicating a person and first region information indicating a region where the person appears, a second class indicating an object and second region information indicating a region where the object appears, and a relationship between the first class and the second class, and the identifying includes inputting the video data into the model for HOID, acquiring the first class and the first region information, the second class and the second region information, and the relationship between the first class and the second class for a person and an object appearing in the video data as outputs of the model for HOID, and identifying a relationship between the person and the object based on the acquired results.

5. The non-transitory computer-readable recording medium according to claim 2, wherein the identifying includes acquiring video data including targets including a person and an object, and identifying the relationship between the person and the object in the acquired video data using graph data indicating a relationship among the targets.

6. The non-transitory computer-readable recording medium according to claim 1, wherein the displaying includes displaying a first questionnaire for the specific user in a region where the specific user faces the display device and displaying a second questionnaire for another user in a region where the another user faces the display device even when both the specific user and the another user face the display device.

7. A display control method comprising: identifying a relationship between a specific user to and an object among a plurality of persons included in video data by analyzing the video data obtained by capturing a first area including the specific user and the object; generating a questionnaire related to the specific user or the object, and including an item that is not identifiable from the video data based on the identified relationship; identifying positions and orientations of users among the plurality of persons with respect to a display device by analyzing video data obtained by capturing a second area including the display device; displaying the questionnaire related to the specific user on the display device to acquire an answer result from the specific user when the specific user is in a state of being closest to the display device and facing the display device and another user is away from the specific user and from the display device and does not face the display device based on the identified positions and orientations, using a processor and registering the identified relationship and the acquired answer result in association with each other in a database.

8. An information processing apparatus comprising: a memory; and a processor coupled to the memory and configured to: identify a specific user and an object among a plurality of persons included in video data by analyzing the video data obtained by capturing a first area including the specific user and the object; generate a questionnaire related to the specific user or the object, and including an item that is not identifiable from the video data based on the identified relationship; identify positions and orientations of users among the plurality of persons with respect to a display device by analyzing video data obtained by capturing a second area including the display device; display the questionnaire related to the specific user on the display device to acquire an answer result from the specific user when the specific user is in a state of being closest to the display device and facing the display device and another user is away from the specific user and from the display device and does not face the display device based on the identified positions and orientations; and registering the identified relationship and the acquired answer result in association with each other in a database.

* * * * *